US008774827B2

(12) United States Patent
Scalisi et al.

(10) Patent No.: US 8,774,827 B2
(45) Date of Patent: Jul. 8, 2014

(54) APPARATUS AND METHOD FOR GENERATING POSITION FIX OF A TRACKING DEVICE IN ACCORDANCE WITH A SUBSCRIBER SERVICE USAGE PROFILE TO CONSERVE TRACKING DEVICE POWER

(75) Inventors: Joseph F. Scalisi, Yorba Linda, CA (US); Desiree Mejia, Redondo Beach, CA (US); David Butler, Rugeley (GB); Roger B. Anderson, Arcadia, CA (US)

(73) Assignee: Location Based Technologies, Inc., Irvine, CA (US)

( * ) Notice: Subject to any disclaimer, the term of this patent is extended or adjusted under 35 U.S.C. 154(b) by 1377 days.

(21) Appl. No.: 12/534,050

(22) Filed: Jul. 31, 2009

(65) Prior Publication Data
US 2009/0315767 A1    Dec. 24, 2009

Related U.S. Application Data

(63) Continuation-in-part of application No. 12/419,451, filed on Apr. 7, 2009, and a continuation-in-part of application No. 11/969,905, filed on Jan. 6, 2008, now Pat. No. 8,102,256, and a continuation-in-part of application No. 11/753,979, filed on May 25, 2007, and a continuation-in-part of application No. 11/933,024, filed on Oct. 31, 2007, and a continuation-in-part of application No. 11/784,400, filed on Apr. 5, 2007, now abandoned, and a continuation-in-part of application No. 11/784,318, filed on Apr. 5, 2007, now abandoned, and a continuation-in-part of application No. 11/935,901, filed on Nov. 6, 2007, now Pat. No. 8,244,468.

(51) Int. Cl.
*H04W 64/00* (2009.01)
*H04W 4/02* (2009.01)

(52) U.S. Cl.
USPC .................. 455/456.1; 455/456.2; 455/456.3

(58) Field of Classification Search
USPC ............ 455/456.1, 456.2, 456.3; 342/357.07, 342/347.09, 357.25
See application file for complete search history.

(56) References Cited

U.S. PATENT DOCUMENTS 3,924,102 A    12/1975    Hanekom
4,218,582 A    8/1980    Hellman et al.
(Continued)

FOREIGN PATENT DOCUMENTS

JP    10325735    12/1998
JP    11064480    3/1999
(Continued)

OTHER PUBLICATIONS

Huff, Greg H., et al., "Directional Reconfigurable Antennas on Laptop Computers: Simulation, Measurement and Evaluation of Candidate Integration Positions", *IEEE Transactions on Antenaas*, vol. 52, No. 12, (Dec. 2004),pp. 3220-3227.

(Continued)

*Primary Examiner* — Christopher M Brandt
*Assistant Examiner* — Muthuswamy Manoharan

(57) ABSTRACT

A tracking device is disclosed for communication of location coordinate information. In one embodiment, the tracking device includes a signal transceiver device, a location coordinate acquisition device, and a computational processor activated and deactivated in accordance with a subscriber service usage profile. The location coordinate acquisition device generates a position fix of the tracking device and a signal transceiver device reports the position fix to a location tracking server. A flash memory device stores a zone management map. In accordance with a fix reporting period based at least in part on a subscriber service usage application including or accessing the subscriber service usage profile, an internal clock activates or deactivates the signal transceiver device, the computational processor, and/or the location coordinate acquisition device. In one example, the internal clock updates a fix reporting period based on current position fix relative to restricted and allowed areas on the zone management map.

6 Claims, 12 Drawing Sheets

(56) References Cited

U.S. PATENT DOCUMENTS

| | | |
|---|---|---|
| 4,850,007 A | 7/1989 | Marino et al. |
| 5,079,541 A | 1/1992 | Moody |
| 5,127,042 A | 6/1992 | Gillig et al. |
| 5,353,331 A | 10/1994 | Emery et al. |
| 5,386,468 A | 1/1995 | Akiyama et al. |
| 5,432,542 A | 7/1995 | Thibadeau et al. |
| 5,541,976 A | 7/1996 | Ghisler |
| 5,555,286 A | 9/1996 | Tendler |
| 5,565,909 A | 10/1996 | Thibadeau et al. |
| 5,785,181 A | 7/1998 | Quartararo, Jr. |
| 5,876,765 A | 3/1999 | Hinterlechner |
| 5,967,841 A | 10/1999 | Bianca et al. |
| 5,973,599 A | 10/1999 | Nicholson et al. |
| 6,078,575 A | 6/2000 | Dommety et al. |
| 6,088,453 A | 7/2000 | Shimbo |
| 6,141,356 A | 10/2000 | Gorman |
| 6,236,365 B1 | 5/2001 | LeBlanc et al. |
| 6,243,039 B1 | 6/2001 | Elliot |
| 6,278,370 B1 | 8/2001 | Underwood |
| 6,300,875 B1 | 10/2001 | Schafer |
| 6,327,533 B1 | 12/2001 | Chou |
| 6,388,612 B1 | 5/2002 | Neher |
| 6,396,403 B1 | 5/2002 | Haner |
| 6,414,629 B1 | 7/2002 | Curcio |
| 6,437,696 B1 * | 8/2002 | Lemelson et al. ......... 340/573.4 |
| 6,441,741 B1 | 8/2002 | Yoakum |
| 6,445,921 B1 | 9/2002 | Bell |
| 6,453,037 B1 | 9/2002 | Welter, Jr. |
| 6,498,797 B1 | 12/2002 | Anerousis et al. |
| 6,546,253 B1 | 4/2003 | Chow et al. |
| 6,611,755 B1 | 8/2003 | Coffee et al. |
| 6,633,835 B1 | 10/2003 | Moran et al. |
| 6,654,883 B1 | 11/2003 | Tatebayashi |
| 6,674,368 B2 | 1/2004 | Hawkins et al. |
| 6,708,028 B1 | 3/2004 | Byrne |
| 6,716,101 B1 | 4/2004 | Meadows et al. |
| 6,732,090 B2 | 5/2004 | Shanahan et al. |
| 6,735,630 B1 | 5/2004 | Gelvin et al. |
| 6,747,561 B1 | 6/2004 | Reeves |
| 6,754,470 B2 | 6/2004 | Hendrickson et al. |
| 6,768,942 B1 | 7/2004 | Chojnacki |
| 6,774,797 B2 * | 8/2004 | Freathy et al. ............. 340/573.1 |
| 6,778,089 B2 | 8/2004 | Yoakum |
| 6,812,824 B1 | 11/2004 | Goldinger et al. |
| 6,819,247 B2 | 11/2004 | Birnbach et al. |
| 6,833,787 B1 | 12/2004 | Levi |
| 6,850,252 B1 | 2/2005 | Hoffberg |
| 6,859,533 B1 | 2/2005 | Wang et al. |
| 6,879,244 B1 | 4/2005 | Scalisi |
| 6,882,897 B1 | 4/2005 | Fernandez |
| 6,928,280 B1 | 8/2005 | Xanthos et al. |
| 6,937,726 B1 | 8/2005 | Wang |
| 6,952,181 B2 | 10/2005 | Karr et al. |
| 6,975,941 B1 | 12/2005 | Lau et al. |
| 6,978,021 B1 | 12/2005 | Chojnacki |
| 6,988,026 B2 | 1/2006 | Breed |
| 6,992,584 B2 | 1/2006 | Dooley et al. |
| 6,998,985 B2 | 2/2006 | Reisman et al. |
| 6,998,995 B2 | 2/2006 | Nakajima |
| 7,019,644 B2 | 3/2006 | Barrie |
| 7,020,701 B1 | 3/2006 | Gelvin et al. |
| 7,038,590 B2 | 5/2006 | Hoffman et al. |
| 7,049,957 B2 | 5/2006 | Watson |
| 7,064,711 B2 | 6/2006 | Strickland et al. |
| 7,065,244 B2 | 6/2006 | Akimov |
| 7,065,348 B1 | 6/2006 | Aoki |
| 7,065,370 B2 | 6/2006 | Ogaki et al. |
| 7,079,650 B1 | 7/2006 | Knudsen |
| 7,088,242 B2 | 8/2006 | Aupperle et al. |
| 7,088,252 B2 | 8/2006 | Weekes |
| 7,099,921 B1 | 8/2006 | Engstrom et al. |
| 7,109,868 B2 | 9/2006 | Yoakum |
| 7,119,669 B2 | 10/2006 | Lundsgaard et al. |
| 7,120,928 B2 | 10/2006 | Sheth et al. |
| 7,139,396 B2 | 11/2006 | Montgomery et al. |
| 7,146,367 B2 | 12/2006 | Shutt |
| 7,149,189 B2 | 12/2006 | Huntington et al. |
| 7,155,238 B2 | 12/2006 | Katz |
| 7,158,912 B2 | 1/2007 | Vock et al. |
| 7,181,192 B2 | 2/2007 | Panasik et al. |
| 7,200,673 B1 | 4/2007 | Augart |
| 7,218,242 B2 | 5/2007 | Scalisi et al. |
| 7,246,007 B2 | 7/2007 | Ferman |
| 7,257,836 B1 | 8/2007 | Moore et al. |
| 7,268,700 B1 | 9/2007 | Hoffberg |
| 7,272,212 B2 | 9/2007 | Eberle et al. |
| 7,272,662 B2 | 9/2007 | Chesnais et al. |
| 7,284,191 B2 | 10/2007 | Grefenstette et al. |
| 7,292,223 B2 | 11/2007 | Suprun et al. |
| 7,299,277 B1 | 11/2007 | Moran et al. |
| 7,302,634 B2 | 11/2007 | Lucovsky et al. |
| 7,313,825 B2 | 12/2007 | Redlich et al. |
| 7,501,952 B2 | 3/2009 | Forster |
| 7,501,984 B2 | 3/2009 | Forster et al. |
| 7,598,855 B2 | 10/2009 | Scalisi et al. |
| 7,612,663 B2 | 11/2009 | Sun |
| 7,626,499 B2 | 12/2009 | Burneske et al. |
| 7,693,527 B2 * | 4/2010 | Krstulich .................. 455/452.2 |
| 7,728,724 B1 | 6/2010 | Scalisi et al. |
| 7,742,774 B2 | 6/2010 | Oh et al. |
| 7,823,073 B2 | 10/2010 | Holmes et al. |
| 7,831,264 B2 | 11/2010 | Miegel |
| 7,995,994 B2 | 8/2011 | Khetawat et al. |
| 8,010,601 B2 | 8/2011 | Jennings et al. |
| 2001/0030667 A1 | 10/2001 | Kelts |
| 2001/0048364 A1 | 12/2001 | Kalthoff et al. |
| 2002/0016189 A1 | 2/2002 | Sheynblat et al. |
| 2002/0041328 A1 | 4/2002 | LeCompte et al. |
| 2002/0067256 A1 | 6/2002 | Kail, IV |
| 2002/0077130 A1 | 6/2002 | Owensby |
| 2002/0180602 A1 | 12/2002 | Yoakum |
| 2002/0186135 A1 | 12/2002 | Wagner |
| 2002/0196123 A1 | 12/2002 | Diehl et al. |
| 2003/0004776 A1 | 1/2003 | Perrella et al. |
| 2003/0043200 A1 | 3/2003 | Faieta et al. |
| 2003/0131073 A1 | 7/2003 | Lucovsky et al. |
| 2003/0177094 A1 | 9/2003 | Needham et al. |
| 2003/0208518 A1 | 11/2003 | Gura et al. |
| 2003/0210262 A1 | 11/2003 | Gahm et al. |
| 2003/0212729 A1 | 11/2003 | Eberle et al. |
| 2003/0235307 A1 | 12/2003 | Miyamoto |
| 2004/0010689 A1 | 1/2004 | Vanstone et al. |
| 2004/0165726 A1 | 8/2004 | Yamamichi et al. |
| 2004/0166879 A1 | 8/2004 | Meadows et al. |
| 2004/0172403 A1 | 9/2004 | Steele et al. |
| 2004/0212493 A1 | 10/2004 | Stilp |
| 2005/0012620 A1 | 1/2005 | Yoakum |
| 2005/0044356 A1 | 2/2005 | Srivastava et al. |
| 2005/0071736 A1 | 3/2005 | Schneider et al. |
| 2005/0099303 A1 | 5/2005 | Suckerman |
| 2005/0159883 A1 | 7/2005 | Humphries et al. |
| 2005/0181870 A1 | 8/2005 | Nguyen et al. |
| 2005/0188403 A1 | 8/2005 | Kotzin |
| 2005/0210260 A1 | 9/2005 | Venkatesan et al. |
| 2005/0246647 A1 | 11/2005 | Beam et al. |
| 2005/0248459 A1 | 11/2005 | Bonalle et al. |
| 2006/0009152 A1 | 1/2006 | Millard et al. |
| 2006/0161377 A1 | 7/2006 | Rakkola et al. |
| 2006/0176149 A1 | 8/2006 | Douglas |
| 2006/0205416 A1 | 9/2006 | Kayzar et al. |
| 2006/0206246 A1 | 9/2006 | Walker |
| 2006/0211405 A1 | 9/2006 | Scalisi et al. |
| 2006/0223518 A1 | 10/2006 | Haney |
| 2006/0232449 A1 | 10/2006 | Jain et al. |
| 2006/0253590 A1 | 11/2006 | Nagy et al. |
| 2006/0290497 A1 | 12/2006 | Sugata |
| 2007/0028088 A1 | 2/2007 | Bayrak et al. |
| 2007/0033531 A1 | 2/2007 | Marsh |
| 2007/0053513 A1 | 3/2007 | Hoffberg |
| 2007/0054530 A1 | 3/2007 | Bauer et al. |
| 2007/0057068 A1 | 3/2007 | Tsai |
| 2007/0061303 A1 | 3/2007 | Ramer et al. |
| 2007/0073719 A1 | 3/2007 | Ramer et al. |
| 2007/0083819 A1 | 4/2007 | Shoemaker |

(56) References Cited

U.S. PATENT DOCUMENTS

| | | | |
|---|---|---|---|
| 2007/0103296 A1 | 5/2007 | Paessel et al. | |
| 2007/0159322 A1 | 7/2007 | Campbell | |
| 2007/0162304 A1* | 7/2007 | Rodgers | 705/2 |
| 2007/0200695 A1 | 8/2007 | Almstrand et al. | |
| 2007/0229350 A1 | 10/2007 | Scalisi et al. | |
| 2007/0240212 A1 | 10/2007 | Matalytski | |
| 2007/0255620 A1 | 11/2007 | Tumminaro et al. | |
| 2007/0285247 A1 | 12/2007 | Forster | |
| 2007/0287473 A1 | 12/2007 | Dupray | |
| 2007/0288427 A1 | 12/2007 | Ramer et al. | |
| 2008/0010585 A1 | 1/2008 | Schneider et al. | |
| 2008/0021741 A1 | 1/2008 | Holla et al. | |
| 2008/0028063 A1 | 1/2008 | Holmes et al. | |
| 2008/0059504 A1 | 3/2008 | Barbetta et al. | |
| 2008/0059889 A1 | 3/2008 | Parker et al. | |
| 2008/0088437 A1 | 4/2008 | Aninye et al. | |
| 2008/0090550 A1 | 4/2008 | Scalisi et al. | |
| 2008/0108370 A1 | 5/2008 | Aninye | |
| 2008/0109762 A1 | 5/2008 | Hundal et al. | |
| 2008/0129491 A1 | 6/2008 | Ruperto | |
| 2008/0171559 A1 | 7/2008 | Frank et al. | |
| 2008/0172173 A1 | 7/2008 | Chang et al. | |
| 2008/0174422 A1* | 7/2008 | Freathy et al. | 340/539.13 |
| 2008/0224854 A1 | 9/2008 | Furey et al. | |
| 2008/0228654 A1 | 9/2008 | Edge | |
| 2008/0252254 A1 | 10/2008 | Osada | |
| 2008/0252459 A1 | 10/2008 | Butler et al. | |
| 2009/0009398 A1* | 1/2009 | Taylor et al. | 342/451 |
| 2009/0098857 A1 | 4/2009 | De Atley | |
| 2009/0098903 A1 | 4/2009 | Donaldson et al. | |
| 2009/0103722 A1 | 4/2009 | Anderson et al. | |
| 2009/0111393 A1 | 4/2009 | Scalisi et al. | |
| 2009/0117921 A1 | 5/2009 | Beydler et al. | |
| 2009/0119119 A1 | 5/2009 | Scalisi et al. | |
| 2009/0167554 A1* | 7/2009 | Munje et al. | 340/825.49 |
| 2009/0174603 A1 | 7/2009 | Scalisi et al. | |
| 2009/0177385 A1 | 7/2009 | Matas et al. | |
| 2009/0189807 A1 | 7/2009 | Scalisi et al. | |
| 2009/0315706 A1 | 12/2009 | Scalisi et al. | |
| 2010/0073229 A1* | 3/2010 | Pattabiraman et al. | 342/357.09 |
| 2010/0216487 A1 | 8/2010 | Yamaguchi | |
| 2013/0157691 A1 | 6/2013 | Beydler et al. | |

FOREIGN PATENT DOCUMENTS

| | | |
|---|---|---|
| JP | 13074494 | 3/2001 |
| KR | 1020020001257 | 1/2002 |
| KR | 1020050063802 | 6/2005 |
| KR | 1005322589 | 11/2005 |
| WO | WO-2007107022 | 9/2007 |

OTHER PUBLICATIONS

Fredrick, Jonathan D., et al., "Smart Antennas Based on Spatial Multiplexing of Local Elements (SMILE) for Mutual Coupling Reduction", *IEEE Transactions on Antennas and Propagation*, vol. 52, No. 1, (Jan. 2004),pp. 106-114.

"Electric Vehicle (EV) Charging Information", *Pasadena Water & Power Website*, www.cityofpasadena.net.

"Mobile Transmit Diversity", *Magnilia Broadband Internet Article*, 14 pages.

Hansen, Michael "Overmolding: A Multifaceted Medical Device Technology", *Medical Device & Diagnostic Industry*, (Jan. 2006),5 pages.

"Material Property Data for Various Thermoplastic Elastomers", *MATLAB*, (May 29, 2007),7 pages.

Mannion, Patrick "Antenna Diversity Doubles CDMA Net Capacity", *EE Times*, (May 12, 2003),3 pages.

Burk, Steve "Overmolding of Embedded Electronics", *Connector Specifier*, Retrieved from the Internet at http:/cs.pennet.com on May 20, 2007,(Apr. 2001),4 pages.

Schuster, Mike et al., "Increasing the Frequency Response of the ADXL Series Accelerometers", *Analog Devices Application Note AN-377*, (Feb. 2006),1 page.

"Small and Thin +_5g Accelerometer", *Analog Devices—ADXL320*, (2004),16 pages.

Matsakis, Demetrios "The Timing Group Delay (TGD) Correction and GPS Timing Basis", *Proceedings of the 63rd Annual Meeting of The Institute of Navigation*, Cambridge, MA, (Apr. 2007),6 pages.

"GPS Compass Solutions—Application vs. Accuracy", *CEACT Information Systems*, (Sep. 13, 2006),10 pages.

"ET301 GPS-UAV Developement Platform", (Jul. 12, 2006),11 pages.

Lemaire, Christophe "Surface Micromachined Sensors for Vehicle Navigation Systems", *Analog Devices, Inc.*, Retrieved from the Internet from http://www.analog.com/en/content/0,2886,764%255F800%255F8077%255F0,00. html on Dec. 25, 2007.,4 pages.

Li, Xiaojing et al., "The Complementary Characteristics of GPS and Accelerometer in Monitoring Structural Deformation", *ION 2005 Meeting*, (2005),9 pages.

Li, Xiaojing et al., "Full-Scale Structural Monitoring Using an Integrated GPS and Accelerometer System", *University of New South Wales*, (Feb. 14, 2006),15 pages.

* cited by examiner

EXAMPLE OF SUBSCRIBER SERVICE USER PROFILE

| Month/Day/Year | Time of Day | Fix Request Interval | Fix Reporting Interval | Battery Life | History |
|---|---|---|---|---|---|
| 01/20/2009 | AM | 5 minutes | 30 minutes | X hrs | X50 in 2/2008 |
| 02/20/2009 | PM | 10 minutes | 45 minutes | 1.5X hrs | X40 in 2/2008 |
| 03/20/2009 | PM | 18 minutes | 50 minutes | 2.0X hrs | X35 in 3/2008 |
| 04/20/2009 | AM | 60 minutes | 60 minutes | 2.5X hrs | X10 in 4/2008 |

APPARATUS AND METHOD FOR GENERATING POSITION FIX OF A TRACKING DEVICE IN ACCORDANCE WITH A SUBSCRIBER SERVICE USAGE PROFILE TO CONSERVE TRACKING DEVICE POWER

PRIORITY AND RELATED APPLICATIONS

This application is a continuation-in-part and claims priority to U.S. patent application Ser. No. 12/419,451 entitled "Apparatus and Method for Adjusting Refresh Rate of a Tracking Device" that was filed on Apr. 7, 2009, and incorporates by reference in its entirety, and claims priority and incorporates by reference in its entirety U.S. patent application Ser. No. 11/969,905 entitled "Apparatus and Method for Determining Location and Tracking Coordinates of a Tracking Device" that was filed on Jan. 6, 2008, now U.S. Pat. No. 8,102,256 and incorporates by reference in their entirety and claims priority to U.S. patent application Ser. No. 11/753,979 filed on May 25, 2007, entitled "Apparatus and Method for Providing Location Information on Individuals and Objects Using Tracking Devices"; U.S. patent application Ser. No. 11/933,024 filed on Oct. 31, 2007, entitled "Apparatus and Method for Manufacturing an Electronic Package"; U.S. patent application Ser. No. 11/784,400 filed on Apr. 5, 2007, now abandoned entitled "Communication System and Method Including Dual Mode Capability"; U.S. patent application Ser. No. 11/784,318 filed on Apr. 5, 2007, now abandoned entitled "Communication System and Method Including Communication Billing Options"; and U.S. patent application Ser. No. 11/935,901 filed on Nov. 6, 2007, now U.S. Pat. No. 8,244,468 entitled "System and Method for Creating and Managing a Personalized Web Interface for Monitoring Location Information on Individuals and Objects Using Tracking Devices."

BACKGROUND OF THE INVENTION

1. Field of the Invention

The invention relates generally to the field of location and tracking communication systems. More particularly, the present invention relates in one embodiment to a power conservation methodology and apparatus incorporated as part of portable electronic tracking device for individuals and objects to improve battery life by a wireless location and tracking system and/or wireless communication system (WCS).

2. Description of Related Technology

Accelerometers are conventionally integrated into electronics systems that are part of a vehicle, vessel, and airplane to detect, measure, and monitor deflections, vibrations, and acceleration. Accelerometers, for example, may include one or more Micro Electro-Mechanical System (MEMS) devices. In particular, MEMS devices include one or more suspended cantilever beams (e.g., single-axis, dual-axis, and three-axis models), as well as deflection sensing circuitry. Accelerometers are utilized by a multitude of electronics manufacturers.

For instance, electronics gaming manufacturers exploit an accelerometer's deflection sensing capability, for instance, to measure device tilt and control game functionality. In another instance, consumer electronics manufacturers, e.g., Apple, Ericsson, and Nike, incorporate accelerometers in personal electronic devices, e.g., Apple iPhone to provide a changeable screen display orientation that toggles between portrait and landscape layout window settings; to manage human inputs through a human interface, e.g., Apple iPod® touch screen interface; and to measure game movement and tilt, e.g., Wii gaming remotes. Still others including automobile electronics circuitry manufacturers utilize MEMS accelerometers to initiate airbag deployment in accordance with a detected collision severity level by measuring negative vehicle acceleration.

Other electronics manufacturer products, e.g., Nokia 5500 sport, count step motions using a 3D accelerometer, and translate user information via user's taps or shaking motion to select song titles and to enable mp3 player track switching. In another instance, portable or laptop computers include hard-disk drives integrated with an accelerometer to detect displacement or falling incidents. For instance, when a hard-disk accelerometer detects a low-g condition, e.g., indicating free-fall and expected shock, a hard-disk write feature may be temporarily disabled to avoid accidental data overwriting and prevent stored data corruption. After free-fall and expected shock, the hard-disk write feature is enabled to allow data to be written to one or more hard-disk tracks. Still others including medical product manufacturers utilize accelerometers to measure depth of Cardio Pulmonary Resuscitation (CPR) chest compressions. Sportswear manufacturers, e.g., Nike sports watches and footwear, incorporate accelerometers to feedback speed and distance to a runner via a connected iPod® Nano.

Still others including manufacturers of conventional inertial navigation systems deploy one or more accelerometers as part of, for instance, on-board electronics of a vehicle, vessel, train and/or airplane. In addition to accelerometer measurements, conventional inertial navigation systems integrate one or more gyroscopes with the on-board electronics to assist tracking including performing various measurements, e.g., tilt, angle, and roll. More specifically, gyroscopes measure angular velocity, for instance, of a vehicle, vessel, train, and/or airplane in an inertial reference frame. The inertial reference frame, provided, for instance, by a human operator, a GPS receiver, or position and velocity measurements from one or more motion sensors.

More specifically, integration of measured inertial accelerations commences with, for instance, original velocity, for instance, of a vehicle, vessel, train, and/or airplane to yield updated inertial system velocities. Another integration of updated inertial system velocities yields an updated inertial system orientation, e.g., tilt, angle, and roll, within a system limited positioning accuracy. In one instance to improve positioning accuracy, conventional inertial navigation systems utilize GPS system outputs. In another instance to improve positioning accuracy, conventional inertial navigation systems intermittently reset to zero inertial tracking velocity, for instance, by stopping the inertial navigation system. In yet other examples, control theory and Kalman filtering provide a framework to combine motion sensor information in attempts to improve positional accuracy of the updated inertial system orientation.

Potential drawbacks of many conventional inertial navigation systems include electrical and mechanical hardware occupying a large real estate footprint and requiring complex electronic measurement and control circuitry with limited applicably to changed environmental conditions. Furthermore, many conventional inertial navigation system calculations are prone to accumulated acceleration and velocity measurement errors. For instance, many conventional inertial navigation acceleration and velocity measurement errors are on the order of 0.6 nautical miles per hour in position and tenths of a degree per hour in orientation.

In contrast to conventional inertial navigation systems, a conventional Global Positioning Satellite (GPS) system uses Global Positioning Signals (GPS) to monitor and track location coordinates communicated between location coordinates monitoring satellites and an individual or an object having a GPS transceiver. In this system, GPS monitoring of location coordinates is practical when a GPS transceiver receives at least a minimal GPS signal level. However, a minimal GPS signal level may not be detectable when an individual or object is not located in a skyward position. For instance, when an individual or object carrying a GPS transceiver enters a covered structure, e.g., a garage, a parking structure, or a large building, GPS satellite communication signals may be obstructed or partially blocked, hindering tracking and monitoring capability. Not only is a GPS transceiver receiving a weak GPS signal, but also the GPS transceiver is depleting battery power in failed attempts to acquire communication signals from one or more location coordinates monitoring satellites, e.g., GPS satellites, or out-of-range location coordinates reference towers. Furthermore, weak GPS communication signals may introduce errors in location coordinates information.

In addition during the acquisition of signaling and or other information, a conventional GPS transceiver has limited functionality or capabilities associated with control and monitoring of battery power usage. For instance, a conventional GPS transceiver may have some indication battery charge level such as a power level bar but have very few or any ability or capability to control or reduce power usage. Furthermore, often users do not realize or are only alerted when their GPS transceiver is using reserve power or about to suddenly involuntarily shut-down to prevent data loss and loss of other user information such as personal GPS settings, screen color displays, and user recreational or pleasure settings.

More specifically, users of conventional GPS transceivers typically are unprepared for such a sudden loss of GPS transceiver service. Generally, within minutes of an initial warning indication, e.g., beeping, vibration, voice, alarms or combination thereof, the GPS transceiver shuts off. As such, a user may suddenly experience loss of location determination or location based capabilities or monitoring or being monitored capabilities and not prepared for such sudden outage. Furthermore, even if a user could reduce battery power usage, a result, within the last few minutes of battery power, a user has little or no incentive or capability to alter battery usage of a conventional GPS transceiver due to low power level GPS transceivers may suddenly become non-operational without any warning to or recourse to a user. Thus, when a conventional GPS transceiver is low in power level, a user's most viable alternative would be locating an electrical outlet to recharge their conventional GPS transceiver.

Furthermore, other more recent publications disclose a mobile computing device, such as the one described in US Publication No. US 2009/0098903 with Publication Date of Apr. 16, 2009 entitled "Using Wireless Characteristic to Trigger Generation of Position Fix" having a wireless transceiver, a location determination circuit and a processing circuit. In the disclosure of this publication, the wireless transceiver is configured to receive a wireless signal over a short range wireless network from a wireless system and the processing circuit is configured to detect a change in the wireless signal and in response to the detected change, to generate a position fix using the location determine circuit.

In summary, there is a need for an electronic tracking device and methodology that provides additional advantages over conventional systems such as improved power management, e.g., efficient use of battery power and provide other improvements include supplementing conventional electronic tracking device monitoring, e.g., increased measurement accuracy of location coordinates of objects and individuals traveling into and/or through a structure, e.g., a partially covered building, a parking structure, or a substantially enclosed structure, such as a basement or a storage area in a high-rise office building.

SUMMARY OF THE INVENTION

In a first aspect of the present invention, mobile location tracking device is disclosed to communicate location coordinate information to subscriber. In one embodiment, location coordinate acquisition device (e.g., Global System for Mobile Communication (GPS) acquisition device) generates a position fix; and location coordinate transceiver device (e.g., Global Positioning Radio System (GPRS) and/or Global Signal Manage (GSM) transceiver device) reports the position fix to a location tracking server. In one example, computational processor includes an internal clock. Memory device stores a zone management map having selected location coordinate zones to indicate restricted and allowable areas or locations. Internal clock activates and deactivates one or more sections or portions of mobile location tracking device in accordance with subscriber service usage application. In one embodiment, the subscriber service usage application is a software application that is resident (e.g., stored) on a flash memory device associated with mobile location tracking device that contains, for instance, subscriber service usage profile, history, and the like.

In one embodiment, subscriber service usage application determines a fix frequency update rate for mobile location tracking device. In another embodiment, GPRS transmission device and computational processor comprises an activated mode and deactivated mode in accordance with the subscriber service usage application. In another embodiment, the internal clock activates or deactivates location coordinate transceiver device (e.g., GPRS and/or GSM transceiver device) and the computation processor in accordance with a current position fix of mobile location tracking device relative to selected location coordinate zones (e.g., restricted, allowed) on zone management map.

In one variant, subscriber service usage application includes a prior or scheduled daily or monthly profile of a subscriber designated reporting interval for mobile location tracking device. In another embodiment, GPRS transceiver device includes a deactivated mode comprises GPRS transceiver device being in a switched-off mode and not in service contact with subscriber and to receive SMS messages sent during switched-off mode during upcoming switched-on mode.

In a second aspect of the present invention, power management device is disclosed to determine update rate and reporting frequency of a position fix of mobile location tracking device having accelerometer to location tracking server. In one embodiment, power management device includes a computational processor having an internal clock, the internal clock activates and deactivates location tracking coordinate transceiver and acquisition GSM and GPRS modules and GPS modules of mobile location tracking device substantially independently of communicated signals by location tracking server.

In one variant, internal clock incorporates mobile location tracking device motion inputs from accelerometer to determine whether to activate and deactivate transmission and acquisition GSM and GPRS modules of location tracking device. In yet another variant, computation processor and/or subscriber service usage application utilizes the motion inputs acquired from the accelerometer to update a previous position fix to a current position fix for mobile location tracking device. In another embodiment, the current position fix updates reporting frequency of a position fix of mobile location tracking device.

In one variant, upon activation by internal clock, GPS module receives current position fix, and reporting frequency of position fix of mobile location tracking device is updated in accordance with the current position fix at least partially in accordance with subscriber service usage profile utilized by subscriber service usage application, which, in one variant, is stored in the flash memory device, and GPS acquisition device returns to a deactivated mode. In yet another embodiment, the subscriber service usage applications updates in accordance with a SMS message communicated between a mobile cellular device or a location tracking server and the mobile location tracking device. In one embodiment, subscriber service usage profile comprises a zone map of selected location coordinates and updates in accordance with SMS message communicated between mobile cellular device or location tracking server and mobile location tracking device.

In another aspect of the present invention, a method is disclosed that conserves device power by controlling update of and reporting of position fix of a mobile location tracking device being tracked to a location tracking server. In this method, GPS acquisition device generates a current position fix. The current position fix is compared relative to a zone map of designated allowed and restricted location coordinate zones. In one variant, the zone map is stored in a flash memory device associated with the mobile location tracking device. A GPRS/GSM transmission device reports the current position fix to the location tracking server. In one variant, the GPRS/GSM transmission device and a computational processor are deactivated in accordance with subscriber service usage pattern and/or the current position fix relative to the zone map of designated allowed and restricted location coordinate zones.

Continuing with this embodiment, internal clock activates substantially independent of communicated signals from location tracking server, GPS acquisition device, GPRS/GSM transceiver device in accordance with subscriber usage service pattern in response to a delta distance, e.g., a distance between position fix of mobile location tracking device relative to zone map of one or more designated allowed and restricted location coordinate zones.

In one variant, deactivation of the GPRS and/or GSM transceiver device includes switching-off the GPRS and/or GSM transceiver device and not providing service contact with subscriber and to receive SMS messages sent during the switched-off mode during an upcoming switched-on mode. In another variant, internal clock activates GPS acquisition device; GPS acquisition device acquires current position fix; and current position fix updates reporting frequency of location coordinates to subscriber; and GPS acquisition device returns to the deactivated mode until activated by the internal clock.

In another embodiment, a subscriber service usage application and/or computational processor analyzes motion measurements acquired from accelerometer to determine if current position fix has entered one or more selected designed or restricted location coordinate zones and has resulted in a zone violation.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages and features of the invention are realized and attained by means of the instrumentalities, procedures, and combinations particularly pointed out in the appended claims.

BRIEF DESCRIPTION OF THE DRAWINGS

FIG. 10 illustrates a subscriber service usage profile of the mobile location tracking device of FIG. 8 in accordance with an embodiment of the present invention.

DETAILED DESCRIPTION

Figure 1:
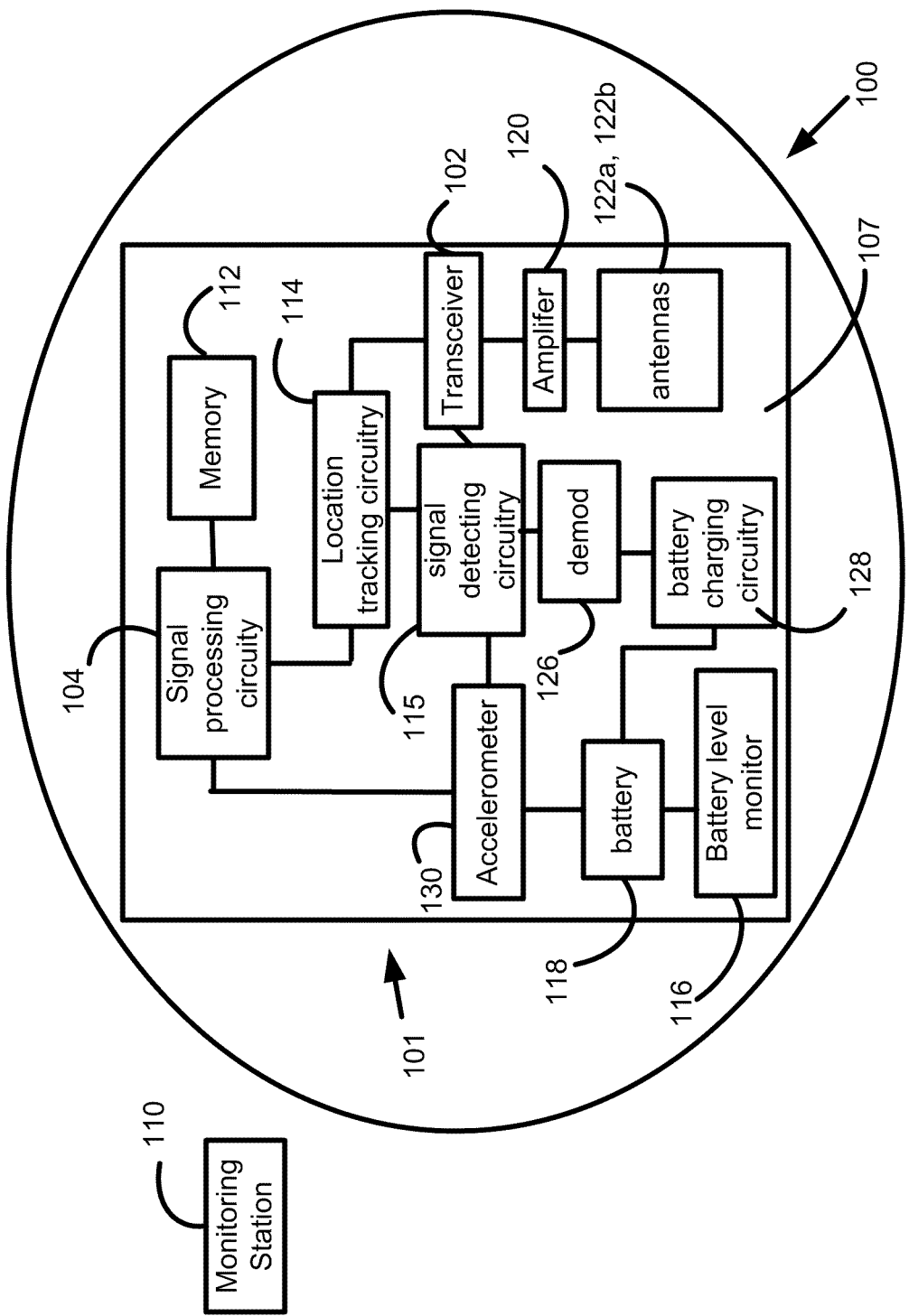
FIG. 1 illustrates a schematic of an electronic tracking device in accordance with an embodiment of the present invention.

Reference is now made to the drawings wherein like numerals refer to like parts throughout.

As used herein, the terms "location coordinates" refer without limitation to any set or partial set of integer, real and/or complex location data or information such as longitudinal, latitudinal, and elevational positional coordinates.

As used herein, the terms "tracking device" and "electronic tracking device" refers to without limitation to any hybrid electronic circuit, integrated circuit (IC), chip, chip set, system-on-a-chip, microwave integrated circuit (MIC), Monolithic Microwave Integrated Circuit (MMIC), low noise amplifier, power amplifier, transceiver, receiver, transmitter and Application Specific Integrated Circuit (ASIC) that may be constructed and/or fabricated. The chip or IC may be constructed ("fabricated") on a small rectangle (a "die") cut from, for example, a Silicon (or special applications, Sapphire), Gallium Arsenide, or Indium Phosphide wafer. The IC may be classified, for example, into analogue, digital, or hybrid (both analogue and digital on the same chip and/or analog-to-digital converter). Digital integrated circuits may contain anything from one to millions of logic gates, invertors, and, or, nand, and nor gates, flipflops, multiplexors, etc. on a few square millimeters. The small size of these circuits allows high speed, low power dissipation, and reduced manufacturing cost compared with board-level integration.

As used herein, the terms "data transfer", "tracking and location system", "location and tracking system", "location tracking system", and "positioning system," refer to without limitation to any system that transfers and/or determines location coordinates using one or more devices, such as Global Positioning System (GPS).

As used herein, the terms "Global Positioning System" refer to without limitation to any services, methods or devices that utilize GPS technology to determine position of a GPS receiver based on measuring a signal transfer time of signals communicated between satellites having known positions and the GPS receiver. A signal transfer time is proportional to a distance of a respective satellite from the GPS receiver. The distance between a satellite and a GPS receiver may be converted, utilizing signal propagation velocity, into a respective signal transfer time. The positional information of the GPS receiver is calculated based on distance calculations from at least four satellites to determine positional information of the GPS receiver.

As used herein, the terms "wireless network", "wireless communication", "wireless link", and "wireless transmission" refers to, without limitation, any digital, analog, microwave, and millimeter wave communication networks that transfer signals from one location to another location, such as, but not limited to IEEE 802.11g, Bluetooth, WiMax, IS-95, GSM, IS-95, CGM, CDMA, wCDMA, PDC, UMTS, TDMA, and FDMA, or combinations thereof.

Major Features

In one aspect, the present invention discloses an apparatus and method to provide an improved capability electronic tracking device. In one embodiment, the device provides electronic circuitry including an accelerometer to measure location coordinates without requiring GPS signaling. In this embodiment, location coordinates of an electronic tracking device are measured when the electronic tracking device is located in a partially enclosed structure, e.g., a building or parking lot, up to a fully enclosed structure. In one embodiment, the electronic tracking device conserves battery power when the device is partially or fully blocked access to location coordinates from one or more GPS satellites, e.g., a primary location tracking system. In yet another embodiment, accelerometer measures force applied to the electronic tracking device and provides an alert message to a guardian or other responsible person. In one embodiment, the alert message includes location coordinates of the electronic tracking device and other information, e.g., magnitude or nature of force, as well as possibility of injury of an object or individual having the electronic tracking device. As described though out the following specification, the present invention generally provides a portable electronic device configuration for locating and tracking an individual or an object.

Exemplary Apparatus

Referring now to FIGS. 1-2 and 4-11 exemplary embodiments of the electronic tracking device of the invention are described in detail. Please note that the following discussions of electronics and components for an electronic tracking device to monitor and locate individuals are non-limiting; thus, the present invention may be useful in other electronic signal transferring and communication applications, such as electronics modules included in items such as: watches, calculators, clocks, computer keyboards, computer mice, and/or mobile phones to location and track trajectory of movement and current location of these items within boundaries of or proximity to a room, building, city, state, and country.

Furthermore, it will be appreciated that while described primarily in the context of tracking individuals or objects, at least portions of the apparatus and methods described herein may be used in other applications, such as, utilized, without limitation, for control systems that monitor components such as transducers, sensors, and electrical and/or optical components that are part of an assembly line process. Moreover, it will be recognized that the present invention may find utility beyond purely tracking and monitoring concerns. Myriad of other functions will be recognized by those of ordinary skill in the art given the present disclosure.

Electronic Tracking Device

Referring to FIG. 1, tracking device 100 contains various electronic components 101 such as transceiver 102, signal processing circuitry 104 (e.g., a microprocessor or other signal logic circuitry), and accelerometer 130. In one non-limiting example, the electronic components 101 are disposed, deposited, or mounted on a substrate 107 (e.g., Printed Circuit Board (PCB)). The PCB 107, for example, may be manufactured from: polyacryclic (PA), polycarbonate (PC), composite material, and arylonitrile-butadiene-styrene (ABS) substrates, blends or combinations thereof, or the like (as described in more detail in incorporated by reference U.S. patent application Ser. No. 11/933,024 filed on Oct. 31, 2007). The signal processing circuitry 104, in one example, associated with the tracking device 100 configured to store a first identification code, produce a second identification code, determine location coordinates, and generate a positioning signal that contains location data (as described in more detail in incorporated by reference U.S. patent application Ser. No. 11/753,979 filed on May 25, 2007). For instance, the location data includes longitudinal, latitudinal, and elevational position of a tracking device, current address or recent address of the tracking device, a nearby landmark to the tracking device, and the like. In one example, electronic tracking device 100 is portable, mobile and fits easily within a compact volume, such as standard shirt pocket having approximate dimensions of 1.5 inch by 2.5 inch by 1.0 inch. In yet another example, electronic tracking device 100 may be one integrated circuit having dimensionality in the mm range in all directions (or even smaller).

In one embodiment, location tracking circuitry 114, calculates location data received and sends the data to signal processing circuitry 104. Memory 112 stores operating software and data, for instance, communicated to and from signal processing circuit 104 and/or location tracking circuitry 114, e.g., GPS logic circuitry. In one embodiment, a signal detecting circuitry 115 detects and measures signal power level. In another embodiment, the signal processing circuitry 104 processes and measures signal power level. Battery level detection circuitry (e.g., battery level monitor 116) detects a battery level of battery 118, which contains one or more individual units or grouped as a single unit.

In one non-limiting example, antennas 122a, 122b electrically couple to transceiver 102. In one variant, transceiver 102 includes one integrated circuit or, in another embodiment, may be multiple individual circuits or integrated circuits.

Transceiver 102 communicates a signal including location data between tracking device 100 and the monitoring station 110, for example, by any of the following including: wireless network, wireless data transfer station, wired telephone, and Internet channel. A demodulator circuit 126 extracts baseband signals, for instance at 100 KHz, including tracking device configuration and software updates, as well as converts a low-frequency AC signal to a DC voltage level. The DC voltage level, in one example, is supplied to battery charging circuitry 128 to recharge a battery level of the battery 118. In one embodiment, a user of monitoring station 110, e.g., a mobile personal digital assistant, mobile phone, or the like, by listening (or downloading) one or more advertisements to reduce and/or shift usage charges to another user, account, or database (as described in more detail in previous incorporated by reference U.S. patent application Ser. Nos. 11/784,400 and 11/784,318 each filed on Apr. 5, 2007).

In another embodiment, an accelerometer 130, for example, a dual-axis accelerometer 130, e.g. ADXL320 integrated circuit manufactured by Analog Devices having two substantially orthogonal beams, may be utilized. The data sheet ADXH320L from Analog Devices is incorporated by reference. In one embodiment, the accelerometer 130 activates upon one or more designated antenna(s), e.g., antennas 122a, 122b, detecting a first signal level, e.g., a low signal level or threshold value, as specified by, for instance, a user or system administrator. In one variant of this embodiment, electrical circuitry associated with GPS signal acquisition, e.g., all or a portion of amplifier block 120, may be, for instance, placed on standby or in a sleep mode. In another embodiment, the accelerometer 130 remains in a standby mode until, for instance, a system administrator, a specified time period, or a user activates the accelerometer 130. In one embodiment, the amplifier block 120 includes multiple electronic functions and blocks including a low noise amplifier, a power amplifier, a RF power switch, or the like, placed in a sleep or standby mode, for instance, to converse a battery level of the battery 118.

In another variant of this embodiment, circuitry, such as amplifier block 120 or location tracking circuitry 114, may be placed in a sleep or standby mode to conserve a battery level of the battery 118. In one variant, the tracking device 100 periodically checks availability of GPS signal, e.g., performs a GPS signal acquisition to determine if a receive communication signal is above a first signal level. Referring to embodiment depicted in FIG. 2, electronic tracking device 100 exits an opening 150 in partially enclosed structure 210; thus, electronic tracking device 100 may resume GPS signal acquisition using GPS satellite 143 (e.g., in response to a periodic check by the tracking device 100 of a receive communication signal level above a first signal level).

In one embodiment, system administrator selects a signal noise bandwidth, e.g., within a range of 3 to 500 Hz, of the accelerator 130 to measure dynamic acceleration (e.g., due to vibration forces applied to electronic tracking device 100). In another embodiment, system administrator selects a signal noise bandwidth, e.g., within a range of 3 to 500 Hz, to measure static acceleration (due to gravitational forces applied to electronic tracking device 100). In particular, external forces on electronic tracking device 100 cause, for example, internal structural movements, e.g., deflection of dual-axis beams, of the accelerometer 130. The deflection of dual-axis beams generates differential voltage(s).

Differential voltage(s) are proportional to acceleration measurements, e.g., discrete acceleration measurements, of electronic tracking device 100, for instance in x, y, and z directions. Differential voltage(s), in one instance, are relative to, for instance, a last known GPS location coordinates of electronic tracking device 100. By performing electronic device proximity measurements, e.g., measuring acceleration vectors of electronic tracking device 100 at time intervals, e.g., T1, T2, T3 . . . TN, monitoring station 110 computes electronic tracking device velocity at time intervals, e.g., T1, T2, T3 . . . TN. In one embodiment, time intervals, e.g., T1, T2, and T3 . . . TN are measured in accordance with instructions by a system administrator or user. In one embodiment, time intervals are selected within a range of one micro-second to several minutes.

In one embodiment, the monitoring station 110 performs an integration of the acceleration measurements as a function of time to compute electronic tracking device velocity at time intervals, e.g., T1, T2, and T3 . . . TN. By referencing prior location coordinates, e.g., last known accurate location data of the electronic tracking device 100 or last known location data of nearby electronic tracking device (e.g., second tracking device 101 in proximity to electronic tracking device 100), monitoring station 110 computes a current location of electronic tracking device 100 utilizing electronic tracking device velocity computations. Advantageously, monitoring station 110, in an above described embodiment, uses above described device proximity measurements to monitor current location data of electronic tracking device 100 without connectivity to receive communication signals from GPS satellites.

Figure 2:
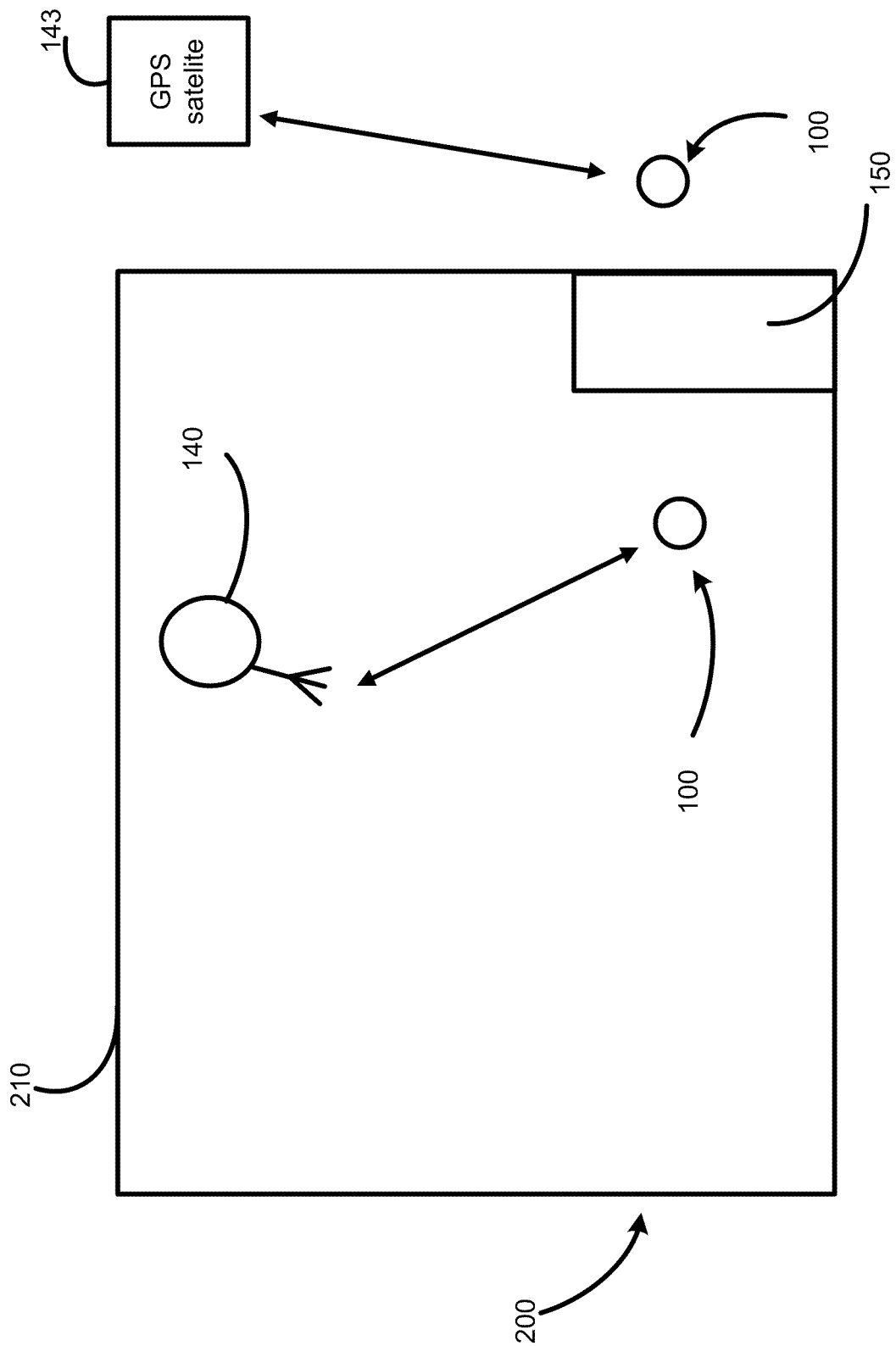
FIG. 2 illustrates a location tracking system associated with the electronic tracking device and the wireless network in accordance with an embodiment of the present invention.

In one embodiment, the monitoring station 110 may include a mobile phone having connectivity to wireless network 140 electrically coupled to electronic tracking device 100 (FIG. 2). In this variant, the wireless network 140 resides or circulates within at least a portion of a semi-enclosed, partially-enclosed, or fully enclosed structure, e.g., building, parking structure, closet, storage room, or the like (e.g., structure 210 in FIG. 2). Furthermore, in one embodiment, the present invention conserves battery power by placing on standby, low power mode, or disabling entirely GPS signal acquisition circuitry and other associated devices, e.g., all or a portion of amplifier block 120 including power amplifiers, LNAs, switches, and the like. Furthermore, during supplemental location coordinates tracking, e.g., electronic device proximity measurements, the transceiver circuitry (e.g., transceiver 102, location tracking circuitry 114, and signal processing circuitry 104) consumes reduced battery power for GPS circuitry while the electronic tracking device 100 communicates displacement vectors (e.g., differential location coordinates) to monitoring station 110 (e.g., a mobile phone, a personal digital assistant) through a wireless network 140. As described above, when GPS signaling is not practicable, electronic device proximity measurements provide differential location coordinate information to calculate current location coordinate information.

In one embodiment, accelerometer, e.g., accelerometer 130, determines if electronic tracking device 100 in a stationary position for a period, for instance, designated by system administrator or user. For example, electronic tracking device 100 may be, for example, located on a counter top, within a pocket of clothing, or inside a suitcase, not being moved, or not currently in use. Continuing with this embodiment, electronic tracking device 100 communicates a code, e.g., a stationary acknowledgement code, to communication network, e.g., wireless network 140. In one variant, when or if monitoring station 110 requests location data through communication network, electronic tracking device 100 determines located in a stationary or substantially stationary position and electronic tracking device 100 communicates its last-known location to the monitoring station 110 without accessing or requiring GPS signaling or active GPS circuitry, e.g., location tracking circuitry 114. Advantageously, in this embodiment, when electronic tracking device 100 does not utilize and require GPS circuitry, e.g., location tracking circuitry 114, or functionality, the power resources are preserved of battery 118 in contrast to many conventional GPS communication system continuing power-on GPS circuitry. In one embodiment, electronic tracking device 130 associated with a person or object remains at a substantially stationary position approximately one-forth to one-third of a calendar day; thus, this feature of not accessing GPS circuitry preserves battery power.

In another embodiment, an accelerometer, such as accelerometer 130, detects tapping against electronic tracking device 100. For instance, upon wake-up, user prompt, system administrator prompt, or active, accelerometer 130 detects a person or object tapping a sequence on electronic tracking device 100. In one embodiment, electronic tracking device 100 includes digital signal programming circuitry (such as of signal processing circuitry 104). The digital signal programming circuitry recognizes programmed motions received by accelerometer, such as accelerometer 130, and transmits an alert message to the monitoring station 110 upon receiving a recognized motion pattern. For example, electronic tracking device 100 may be programmed to recognize an "SOS tap cadence". Thus, if electronic tracking device 100 is repeatedly tapped, for instance, in a "dot-dot-dot, dash-dash-dash, dot-dot-dot" pattern, signal processing circuitry 104 recognizes a motion pattern and transmit an alert message to wireless network 114 to monitoring station 110. In one instance, alert message may be associated as a distress pattern and will require an appropriate response. In one variant, the accelerometer may recognize when an object or individual spins or turns motion of electronic tracking device 100. Continuing with this embodiment, signal processing circuitry 104 recognizes programmed motions, and transceiver 102 transmits an alert message to wireless network 114 associated with programmed motions. In another variant, electronic tracking device 100 is programmed to recognize other motion patterns, such as, when it is tumbled or flipped. Depending upon on duration, time, or cadence of these movements or motion patterns, electronic tracking device 100 communicates an alert message to the wireless network 114. In one variant, wireless network 114 performs an appropriate action, such as communicating information signal to monitoring station 110.

In another example, physical impacts on electronic tracking device 100 are measured to determine if an individual or object may be injured. In one embodiment, magnitude of displacement vectors may be measured by one or more accelerometers, such as accelerometer 130, disposed at various inclinations and orientations, e.g., disposed substantially orthogonal to one another. Continuing with this embodiment, when a measured physical impact is above a predetermined level, an object or individual associated with electronic tracking device 100 may have suffered a fall or be in need of medical attention. In one variant of this embodiment, a user (e.g., a system administrator, or person located in a contact book) at monitoring station 110 becomes alerted, e.g., by text message, email, or voice mail (as more fully described in previously incorporated by reference U.S. patent application Ser. No. 11/935,901 filed on Nov. 6, 2007, entitled "System and Method for Creating and Managing a Personalized Web Interface for Monitoring Location Information on Individuals and Objects Using Tracking Devices"). In one variant of this embodiment, if a user does not affirmatively respond, another individual, guardian, medical personnel, or law enforcement officer is contacted by monitoring station 110 (as more fully described in Ser. No. 11/935,901). In yet another variant of this embodiment, monitoring station 110 continues to contact individuals until the alert message is affirmatively answered.

Battery Conservation

Figure 3:
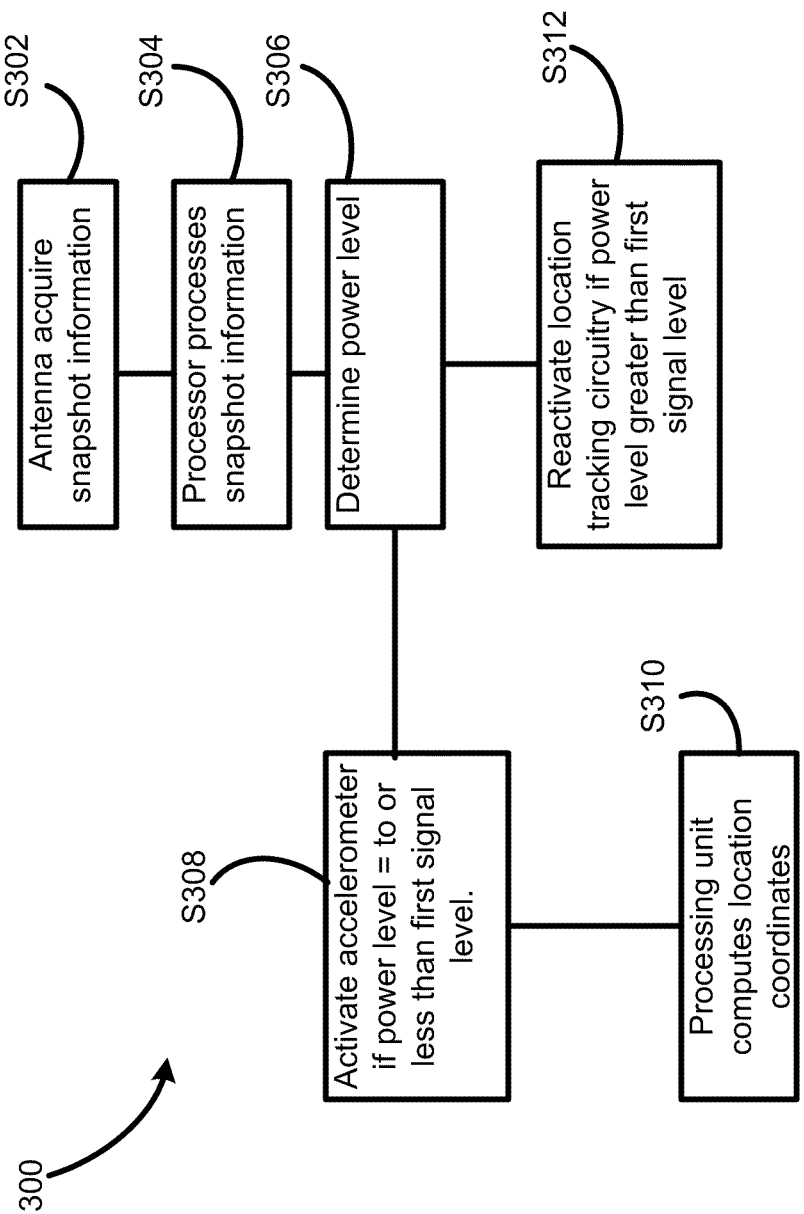
FIG. 3 illustrates a flow diagram to manage and control circuitry associated with the electronic tracking device of FIGS. 1 and 2 in accordance with an embodiment of the present invention.

Referring to FIG. 3, a flow chart 300 illustrates battery conservation for electronic tracking device 100 as described in FIGS. 1, 2 in accordance with one embodiment of the present invention. In step 302, antenna 122a associated with electronic tracking device 100 acquires a snapshot of receive communication signal including location coordinates data. In step 304, processing unit 104 processes the snapshot of receive communication signal including location coordinates data. In step 306, processing unit 104 determines a power level of receive communication signal. In step 308, accelerometer 130 activates if a power level of the receive communication signal is insufficient for processing. In one variant of step 308, accelerometer 130 measures acceleration of electronic tracking device 100 at time intervals, e.g., T1, T2, T3 . . . TN.

In step 310, processing unit 104 computes current location coordinates using acceleration measurements. In step 312, all or a portion of amplifier block 120 and associated circuitry, e.g., location tracking circuitry, are activated at selected time intervals to determine if receive communication signal is of sufficient signal strength. In one variation of step 312, upon determining receive communication signal of sufficient signal strength, location tracking circuitry 114 are activated, and processing unit 104 determines location coordinates from the receive communication signal. In another variation of step 312, upon determining receive communication signal of sufficient signal strength, accelerometer 130 is deactivated and location tracking circuitry 114 are activated, and processing unit 104 determines location coordinates from the receive communication signal.

User Adjustable Location Coordinate Refresh Rate

Figure 4:
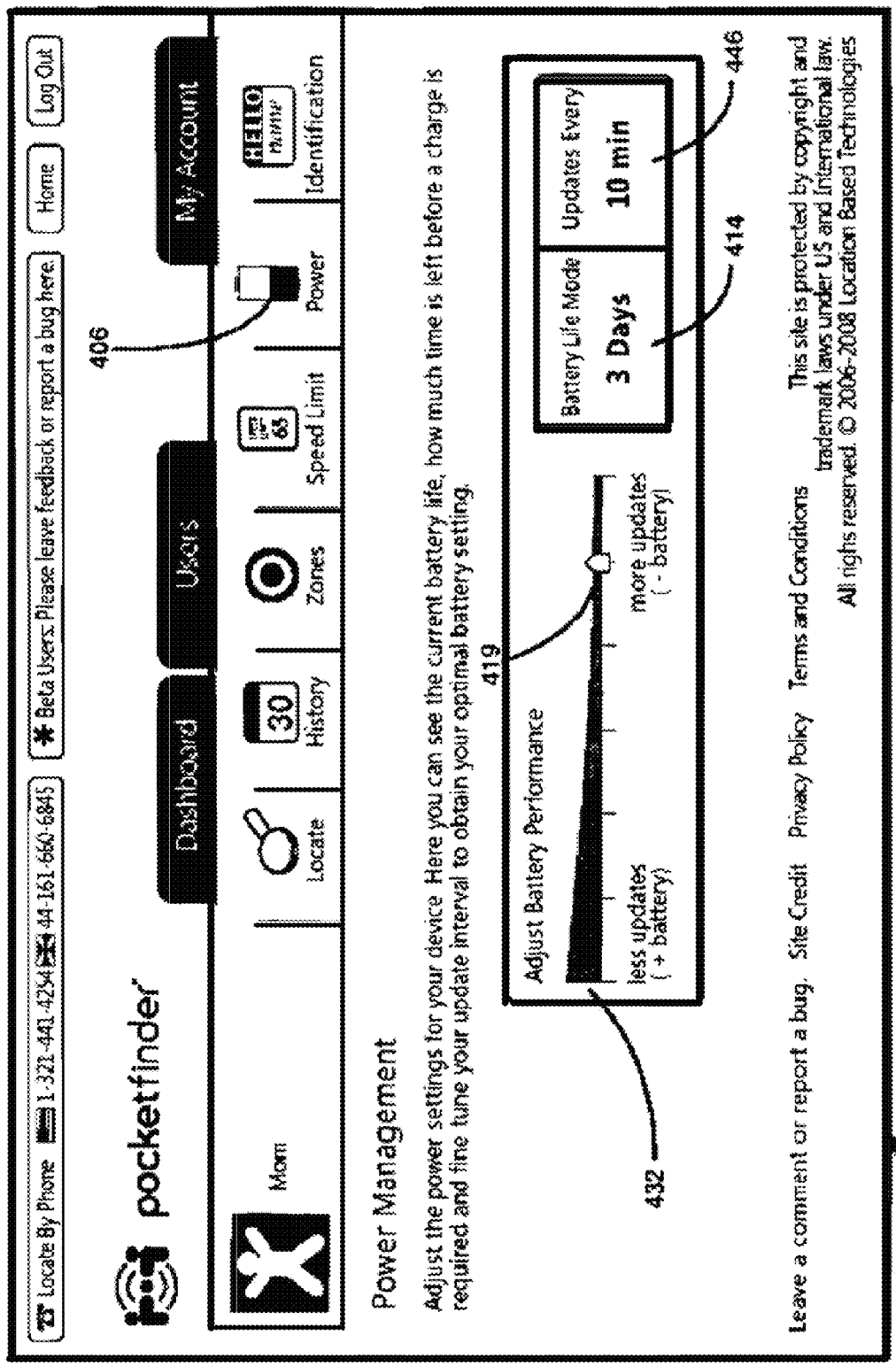
FIG. 4 illustrates a screen display including a user definable adjustable power level monitor in accordance with an embodiment of the present invention.
Figure 5:
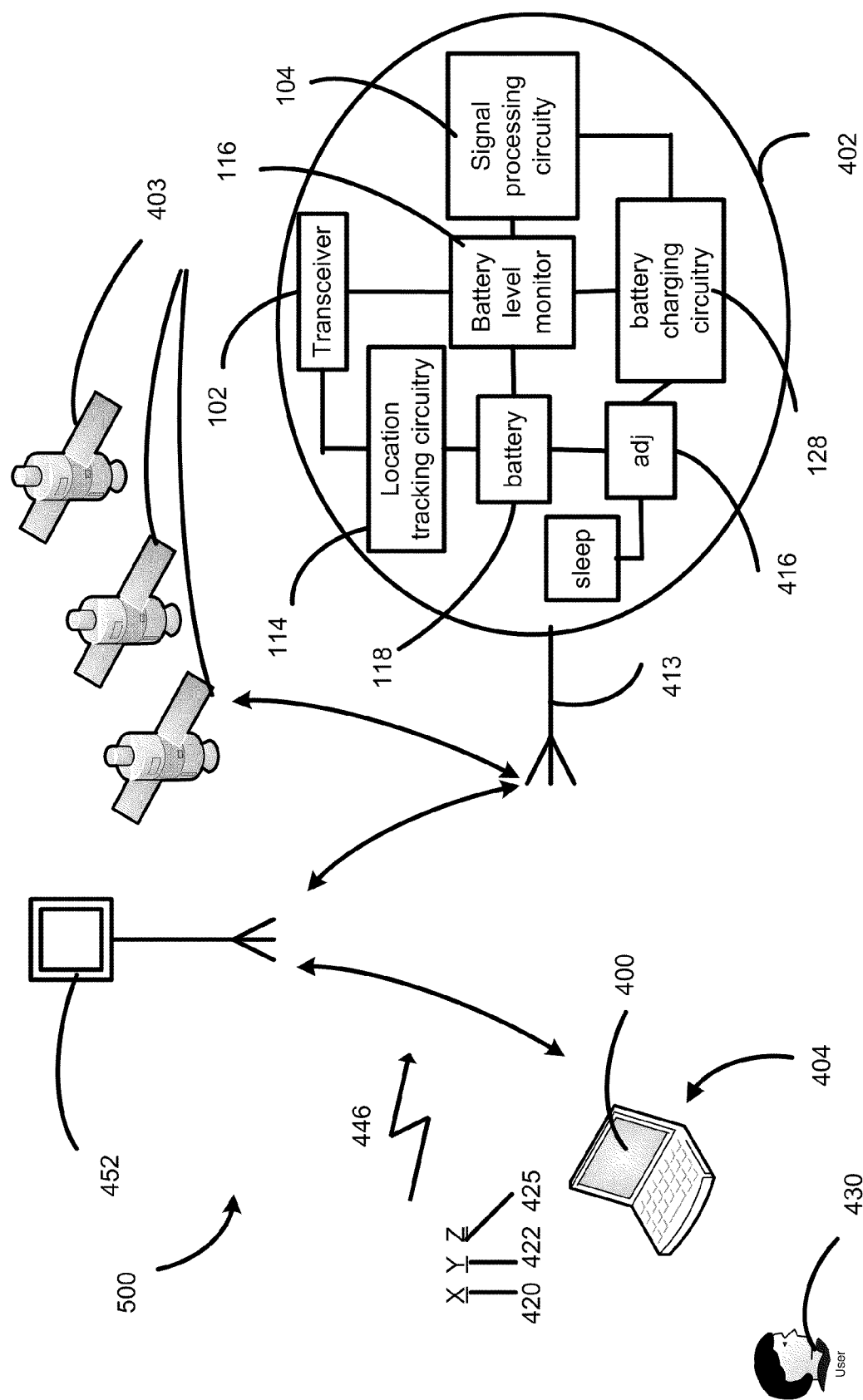
FIG. 5 illustrates a location coordinate navigational system utilizing user definable power level monitor of FIG. 4 in accordance with an embodiment of the present invention.

Referring to FIG. 4, screen display 400 illustrates a user definable adjustable location coordinate refresh rate in one embodiment of the present invention. As best illustrated in FIG. 5, schematic 500 illustrates communication of location coordinate refresh rate between portable electronic tracking device 402 and satellite navigation system 403 in accordance with an embodiment of the present invention.

In one embodiment, portable electronic tracking device 402 monitors location coordinates of one or more individuals and objects using satellite navigation system 403. Portable electronic tracking device 402 includes battery 118 having battery charge level 406 displayed on screen display 400 of personal communication device 404 (e.g., mobile phone, wireless digital assistant, laptop computer, personal computer and the like). Other components of portable electronic tracking device 402 include transceiver 102, signal processing circuitry 104, battery level monitor 116, signal processing circuitry 104, location tracking circuitry 114, adj 416, and battery charging circuitry 128.

In one example, battery level monitor 116 measures in real-time battery charge level 406. In one embodiment, battery level monitor 116 predicts, for instance, estimated remaining battery charge life 414 in response to battery charge level 406. This estimation or prediction may be based on standard techniques know by those skilled in the art at the time of this disclosure including measurement of time average amperage draw and voltage level (over a given period) to estimate remaining battery charge life 414.

In one embodiment, local battery power adjustment mechanism 416 generates in substantially real-time updated set of network communication signaling protocols. In one variant, updated set of network communication signaling protocols communicated, for instance, includes an update rate (e.g., refresh rate) of location coordinate packets 446. In one example, update rate of location coordinate packets 446 includes request rate 420 of location coordinate packets 422 by target host 452 (e.g., a computer server) and/or listen rate 425 of location coordinate packets 422 by portable electronic tracking device 402. Updated set of network communication signaling protocols, for instance, has value (e.g., X Y Z) responsive to user input request 430.

In one embodiment, to conserve battery power when communicating messages between target host 452 and portable electronic tracking device 402, local battery power adjustment mechanism 416, for instance, remotely by personal communication device 404 communicates a message to active or deactivate a portion of transceiver circuitry 102 or processor circuitry 104 or location tracking circuitry 114 to conserve battery charge level 406 responsive to value 419 (e.g., a user input screen control or mouse adjustable cursor value). In one variant, local battery adjustment mechanism 416 includes user adjustable screen icon 432 to graphically display in substantially real-time trade-off relationships between remaining battery charge level 414 and update rate 446 (e.g., refresh rate) of location coordinate packets 422. Advantageously as compared to conventional tracking devices, user input request 430 adjusts value 419 to select an appropriate update set of network communication signaling protocols to achieve a desired user defined battery operating environment, e.g., obtain optimal battery life, obtain optimal update rate, tradeoffs between them. In one embodiment, when user adjusts slider 432 to value 419, a message is sent to target host 452, which communicates an updated set of network communication to portable location tracking device 402.

Figure 6:
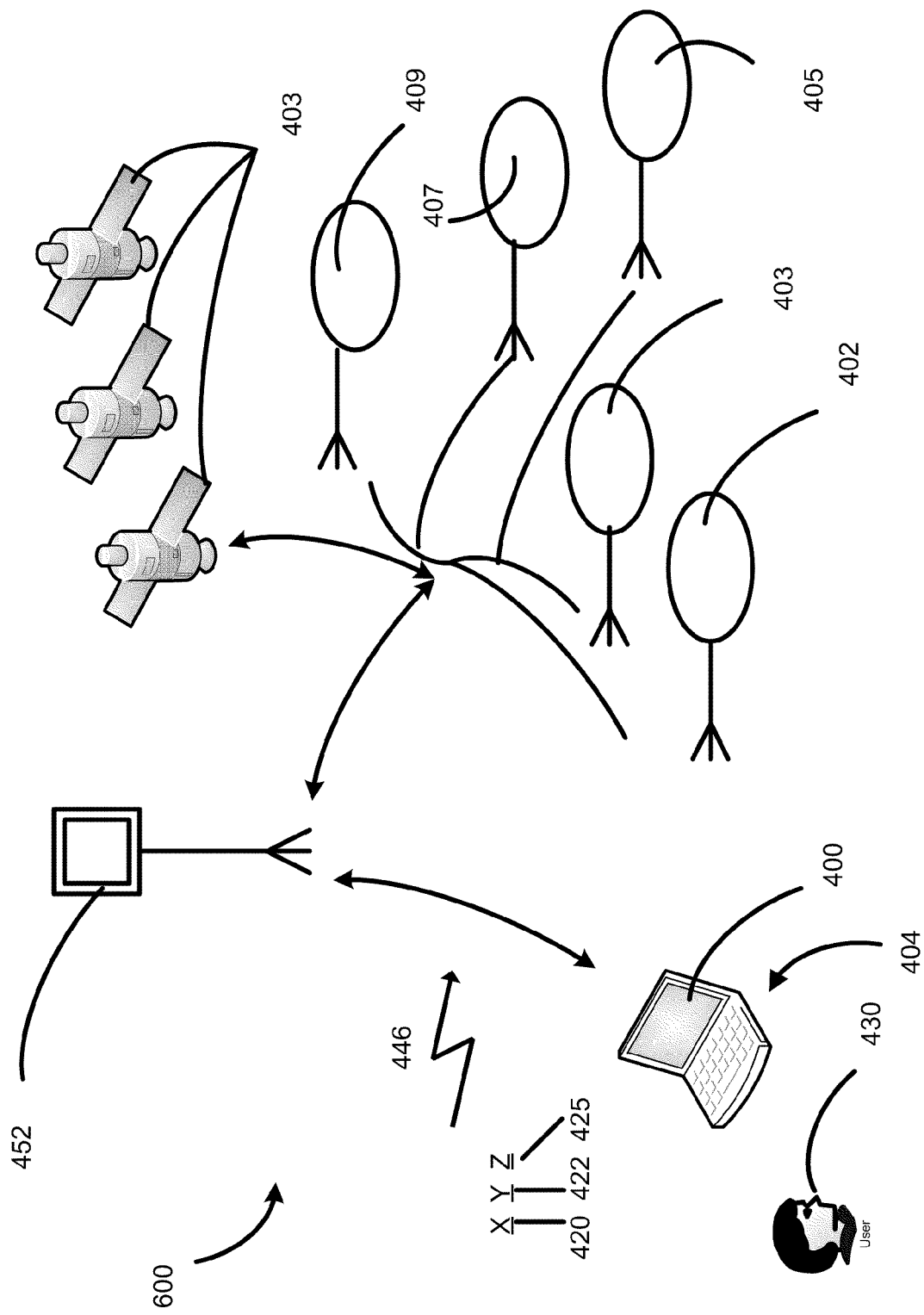
FIG. 6 illustrates a location coordinate navigation system utilizing a user definable power level monitor of FIG. 4 in accordance with an embodiment of the present invention.

In response to receipt of updated set of network communication signaling protocols, portable location tracking device 402 adjusts settings (an internal time schedule) and acknowledges receipt of the message to target host 452. Portable location tracking device 402 checks internal time schedule to determine if it should listen for (perform a location lookup of) location coordinates 422 from satellite navigation system 403 or an adjacent portable location coordinate tracking device (as shown in FIG. 6) as more fully described in, for instance, U.S. patent application Ser. No. 11/753,979 filed on May 25, 2007, which has been previously incorporated by referenced and claimed priority to. Portable location tracking device 402 obtains location coordinates 422 and stores, for instance, in one or more internal breadcrumb memory location(s). Based on the internal time schedule, portable location tracking device 402 determines whether to transmit contents of the one or more breadcrumb memory location(s) to target host 452.

Upon transmission of contents, target host 452 acknowledges receipt of contents of one or more breadcrumb memory locations. In one variant, target host 452 issues a command to flush one or more breadcrumb memory locations. In this same variant, portable electronic tracking device 402 flushes its internal breadcrumb memory and acknowledges completion of the command to the target host 452. In another variant, target host 452 issues a stack pointer adjustment command to acknowledge receipt of previously submitted contents of breadcrumb memory locations and to move stack pointer to an adjacent or an alternative breadcrumb memory location to signal that these memory location have been uploaded by target host 452.

In another embodiment, local battery adjustment mechanism 416 includes timing adjustment mechanism 446 adjusting, for instance, request rate 420 of location coordinate packets 422 to target host 452 and listen rate 425 of location coordinates 422 in accordance with a current location coordinate position of portable tracking device 402. In one variant, local battery adjustment mechanism 416 includes user adjustable electronic display 432 that indicates current level of battery 406 and allows user a capability to adjust power level thereof. In one variant of this embodiment, local battery adjustment mechanism 416 includes automatic or semi-automatic sleep mode 448. In one embodiment, automatic or semi-automatic sleep mode 448 sets to a minimal level request rate 420 of location coordinate packets 422 to target host 452 and listen rate 425 of location coordinates 422 until battery power monitor 116 measures, for instance, a sustainable battery charge level to sustain operation of portable electronic tracking device 402.

In one embodiment, local battery adjustment mechanism 416 includes charge control management (e.g., adj 416) of portable electronic tracking device 402 that estimates charge capability (e.g., battery charge remaining 414) and adjusts cycling of one or more of request rate 420 of location coordinate packets 422 to target host 452 and listen rate 425 of location coordinate packets 422 to maximize charge capability. In one alternative embodiment, local battery adjustment mechanism (e.g., adj 416) includes cycle management apparatus 416 to set up, for example, timing schedule (e.g., refresh rate 446) to maximize effectiveness of request rate 420 and listen rate 425 in response to substantially real-time measured velocity of travel of portable electronic tracking device 402.

Referring to FIGS. 5 and 6, system 500 and system 600 respectively include local charging management device (e.g. local battery adjustment mechanism 416) manages electrical resource capability for an electronic tracking device 402 that is tracked by at least one other tracking device (e.g., devices 403, 405, 407, 409). In one embodiment, tracking device (e.g., portable electronic tracking device 402) includes a battery level monitor 116 remotely located for charging unit (e.g., battery charging circuitry 128), adj 416 (e.g., electrical power resource management component, local battery adjustment mechanism 416). In one variant, electrical power resource management component adjusts cycle timing of request rate 420 of location coordinate packets 422 to target host 452 and listen rate 425 of location coordinate packets 422 from satellite navigation system 403 responsive to estimated charge level of charging unit (e.g., battery charge level 406).

In one embodiment, electrical power resource management component (e.g., local battery adjustment mechanism 416) includes a substantially real-time user viewable display icon 432 that indicates estimate charge level (e.g., battery level 406) and provides an on-line user adjustable cursor display 432 (see FIG. 4). In one example, on-line cursor display 432 adjusts one or more of: request rate 420 of location coordinate packets 422 to target host 452 and listen rate 425 and gives substantially automatic updated estimated charge level of the charging unit (e.g., battery charging circuitry or unit 128). In one variant, local battery management device 416 includes charge control management of electronic tracking device 402 that estimates charge capability and adjust cycling of request rate 420 of location coordinate packets 422 to host target 428 and listen rate 425 of location coordinate packets 422 from satellite navigation system 403 or alternatively an adjacent portable location tracking device to maximize charge capability.

In yet another embodiment, local charging management device 416 includes cycle management apparatus to set up timing schedule 446 to maximize effectiveness of request rate 420 and listen rate 425 in response to measured velocity of travel portable electronic tracking device 402. In one variant, local charging management device 416 electrically coupled through personal communication device 404 sets up timing schedule 446 between one or more than one wireless communication networks to communicate information between portable electronic tracking device 402. In one example of this embodiment, listen rate 425 of location coordinate packets 422 to the host target 428 and response rate 425 includes global positioning system (GPS) system refresh rate 446.

Advantageously as compared to prior global positioning systems having manufactured defined power settings, the current invention power charging monitor (e.g., battery level monitor 116) measures a power level (e.g., battery power level 406) of the power charging unit (e.g., battery level monitor 116) and substantially automatically adjusts power usage responsive to available power of power charging unit to maximize power life.

In yet another advantage, the present invention power charging monitor (e.g., battery level monitor 116) measures a power level (e.g., battery power level 406) of power charging unit (e.g., battery 118) and adjusts a power level (e.g., battery power level 406) applied to, for example, location tracking circuitry (e.g., location tracking circuitry 114) or transceiver 102 responsive to one or more signal levels. In contrast to previous manufacturer tracking device power level settings, the present invention has the capability of power level (e.g., battery power level 406) adjustments include multitude of threshold values (see active display 432 of FIG. 4) that is determined by user or system administrator to intermittently activate or deactivate location tracking circuitry (e.g., location tracking circuitry 114) to conserve power of the power charging unit (e.g., battery 118) responsive to estimated charge level (e.g., battery charge level 406).

In a first example, a lost dog has portable location tracking device 402. Using the present invention, a user, e.g., a dog owner, will adjust a slider level, such as using on-line cursor display 432, to a high update rate interval. For instance, the high setting corresponds to 15 minute intervals for location and 15 minute intervals for transmission to target host, e.g., server. The server sends these settings to portable location tracking device 402 and portable location tracking device 402 adjusts its settings and acknowledges the message. As such, portable location tracking device 402 will perform frequent updates of its location coordinates from a satellite navigation system and will transmit frequently its location coordinates to a target host. Thus, advantageously, with this setting, a user will probably more rapidly locate a missing or lost pet. With this setting, battery life will be relatively short.

In a second example, a teenager borrows a parent's car having portable location tracking device 402. Using the present invention, users, e.g., parents, desire to know if their teenager is driving safely in designated areas or locations, but does not want to track the teenager's location in real-time. In this case, the parents adjust a slider level, such as using on-line cursor display 432, to a medium update rate interval. For instance, the medium setting corresponds to 15 minute intervals for location and 60 minute intervals for transmission to the target host, e.g., server. The server sends these settings to portable location tracking device 402 and portable location tracking device 402 adjusts its settings and acknowledges the message. As such, portable location tracking device 402 will perform frequent updates of its velocity and location coordinates from a satellite navigation system and will less frequently transmit its location coordinates to a target host. As long as the teenager remains in allowed areas and traveling at allowed speeds, the portable location tracking device will not transmit frequently. Fortunately, during these infrequent transmissions, portable location tracking device will transmit its location history. Thus, advantageously, with this setting, parents can see history at many locations while still preserving battery life, e.g., longer life than first example.

In a third example, a provider of construction equipment having portable tracking device 402 rents the equipment to contractors. Using the present invention, a user, e.g., provider desires to know location of the equipment once per day. In this case, the provider adjusts a slider level, such as using on-line cursor display 432, to a low update rate interval. For instance, the low setting corresponds to 1440 minute intervals (24 hours) for location coordinates and 1440 minute intervals (24 hours) for transmission to the target host, e.g., server. The server sends these settings to portable location tracking device 402 and portable location tracking device 402 adjusts its settings and acknowledges the message. As such, portable location tracking device 402 will perform infrequent updates (once per day) of location coordinates from a satellite navigation system and will less frequently transmission (once per day) of its location coordinates to a target host. Thus, advantageously, with this setting, portable location coordinate device will realize increased battery life, e.g., longer life than first and second examples.

User Adjustable Power Level Monitor Flow Chart

Figure 7:
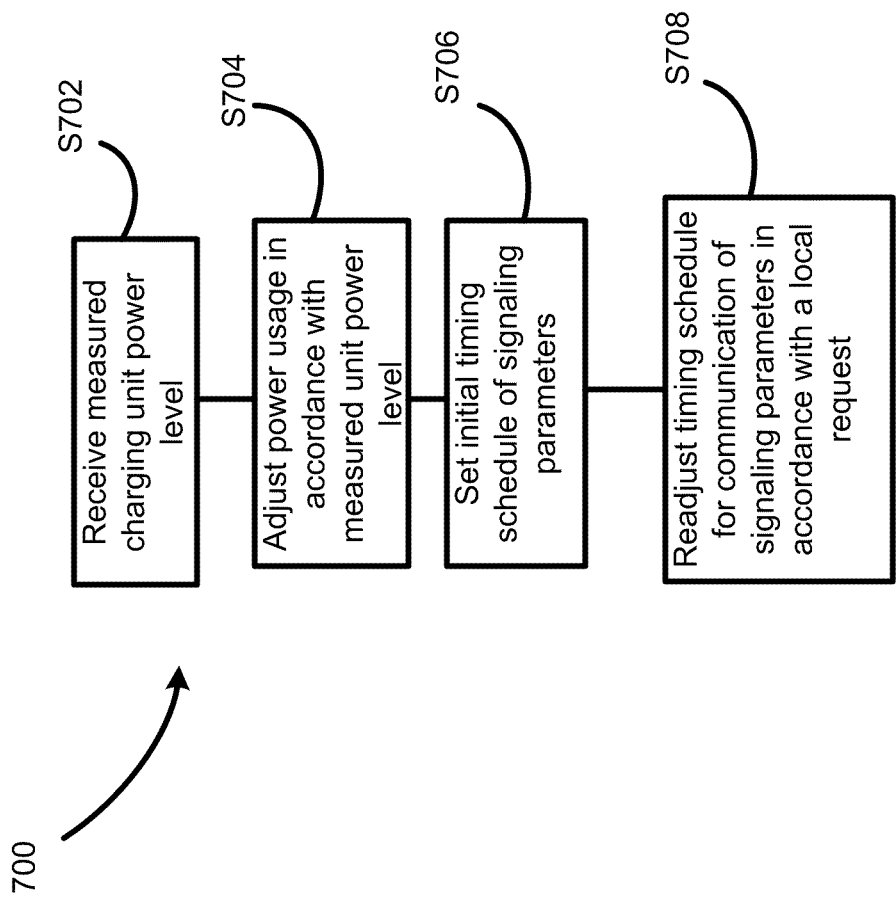
FIG. 7 illustrates a flow diagram of a user definable adjustable power level monitor in accordance with an embodiment of the present invention.

Referring to FIG. 7, flow chart 700 illustrates user definable adjustable conservation power level monitor for portable electronic tracking device 402 as described in FIGS. 4, 5, and 6 in accordance with one embodiment of the present invention.

In step 702, user receives measured charging unit power level of tracking device 402 communicated by a location coordinate tracking system 403. In step 704, system administrator, user, automatic or semi-automatic program software adjusts charging unit power level of tracking device 402 in response to a substantially-real life estimate of the unit power level 406 of a charge unit 118 of tracking device 402.

In step 706, system administrator, user, automatic or semi-automatic power monitoring software program creates an initial timing schedule 446 including communication of signaling parameters associated with a request rate 420 communicated with location coordinate information 422 and listen rate 425 of location coordinate information 422. In one variant of step 706, initial timing schedule 446 was at least partially automatically and responsive to an estimated power level 414 of the charge unit 118.

In step 708, user readjusts the initial timing schedule 446 for communication of signaling parameters in accordance with a local request by remote user using an Internet accessible icon 432 that displays user viewable tradeoffs between the estimated charge unit life and charge unit update rate. In one variant of step 708, remote user uses a mouse to enter an on screen cursor value 419 that is associated with a tradeoff of estimated charge life 414 and an update rate 446 of location coordinate information 422.

Position Fix is Updated in Accordance with Subscriber Service Usage Application

Referring to FIGS. 8-11, location tracking server 902 tracks mobile location tracking device 901. Location tracking server 902 communicates location coordinate information to subscriber 904. In one embodiment, GPS acquisition device 906 generates a position fix 910 (e.g., location coordinate information) of mobile location tracking device 901. In one embodiment, GPS acquisition device 906 acquires GPS data over a few milliseconds. Using GPS data, CPU 918, e.g., GSM baseband processor, utilizes, for instance, SPOT a-GPS solution algorithms calculates improved accuracy position fix results. GPRS/GSM transceiver device 908 (having one or both GPRS and GSM capability) reports position fix to location tracking server 902. NXP GSM/GPRS & GSS power management software installed on the mobile location tracking device 901 assists maintaining efficient power consumption.

As best illustrated in FIG. 10, memory device, e.g., flash memory device 912, stores zone management map 917 having selected location coordinate zones stored in flash memory device 912 to indicate restricted location zones 914 and allowable location zones 916. The restricted zones 914 and allowable zones 916, for example, are chosen by subscriber 904. In one embodiment, computational processor, e.g., CPU 918, includes internal clock 920. In one variant of this embodiment, internal clock 920 substantially activates and deactivates functionality of computational processor 918 independently of any signaling from an external device, e.g., location tracking server 902. In one exemplary embodiment, GPRS/GSM transceiver device 908 and computational processor 918 comprises an activated mode and a deactivated mode in accordance with subscriber service usage profile 907 (subscriber service usage pattern).

In one variant, internal clock 920 activates and deactivates one or more modules, e.g., GPS acquisition device 906 and GPRS and/or GSM transceiver device 908 changes in accordance with subscriber service usage application, e.g., a software application including subscriber service usage profile 907. Subscriber service user profile 907 includes subscriber desired and/or previous frequency of receipt of fix reports. In one embodiment, subscriber service usage application includes a software application, e.g., that is loaded into flash memory 912, utilizing usage parameters extracted or stored or acquired from subscriber service usage profile 907 to update position fix of mobile tracking device 901.

As best illustrated in FIG. 10, an exemplary subscriber service usage profile displays typical usage and location coordinate requests and battery charge associated therewith. In one embodiment, initial subscriber service usage profile 907 may be high when first purchase mobile location tracking device 901, e.g., reporting every 5 minutes to location tracking server 902 which equates to battery charge period of X hours. However, upon subscriber service usage profile 907 becoming less intensive, lower frequency of fix reporting interval, e.g., reporting every 60 minutes to location tracking server 902 which equate to battery charge period of 2.5× hours (as compared to original X hours). Thus, using principles of the present invention, battery charge period (e.g., battery 118) of mobile tracking device 901 including frequency of position fix acquisition and frequency of position fix reporting may be individually tailored and responsive to one or more usage profiles, e.g., subscriber service usage profile 907 or combined or modified with those displayed in FIG. 11 to customize power usage. In comparison, many conventional tracking devices acquire position fix, for instance, having standard or regularly spaced intervals or periods which don't modify based on subscriber service usage requests (and that may change as shown above) sacrifice unnecessarily battery power.

Figure 11:
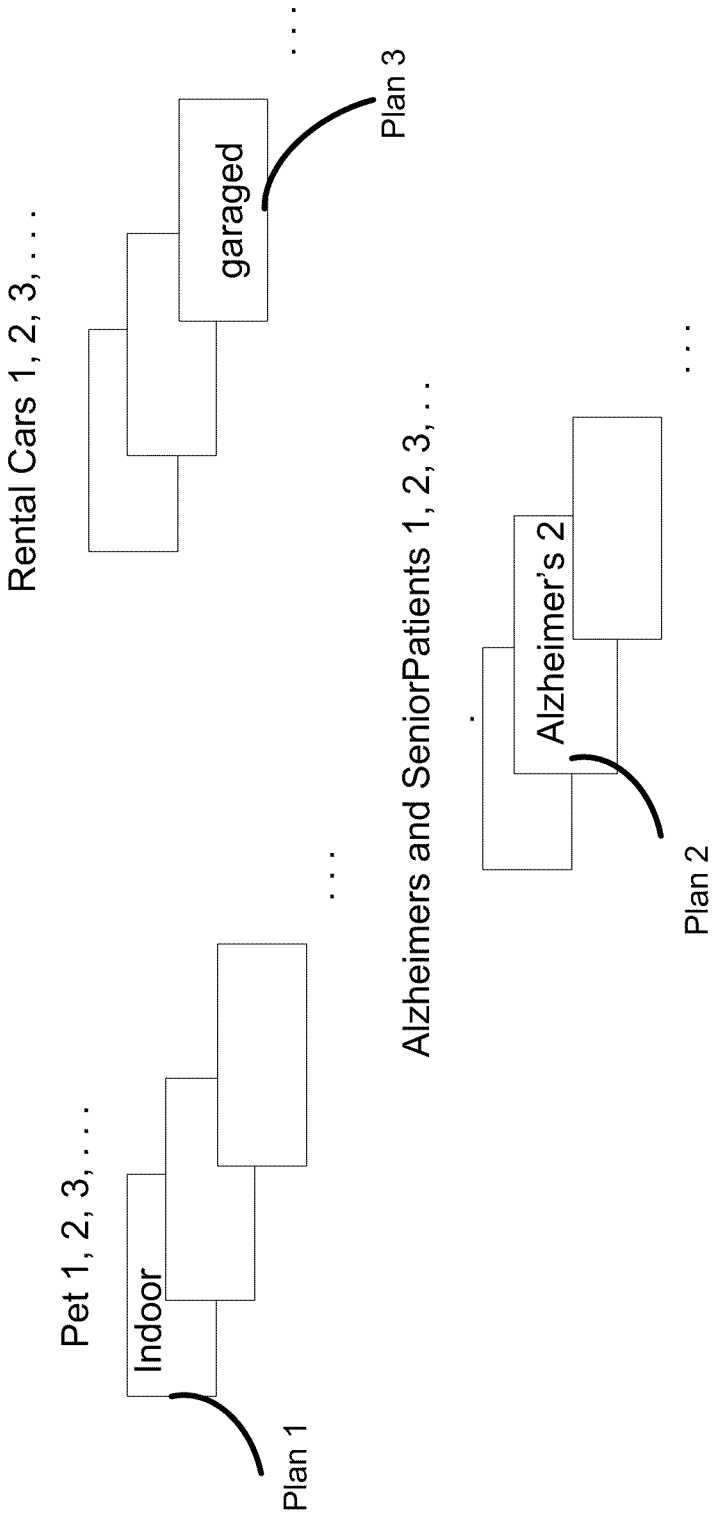
FIG. 11 illustrates a collection of data files that form a location coordinate library of standardized subscriber service usage profiles that are utilized to optimize power usage of a subscriber service usage profile including tracking and reporting intervals in accordance with one embodiment of the present invention.

As illustrated in FIG. 11, subscriber service usage profile 907 may be compared or modified and partially responsive to current historical (e.g. legacy) power optimized usage plans (e.g., plans including Pet1, 2, 3 . . . ; Rental Car 1, 2, 3 . . . ; and Alzheimer's and Senior Patients 1, 2, 3 . . . The power optimized plans are part of a location coordinate service library (e.g., resident on flash memory device 912, stored in location tracking server 902, or other similar location) and categorized in accordance with usage characteristics of subscriber 904 as well as tracked pet, tracked person, or tracked object carrying mobile tracking device 901.

Referring again to the embodiment illustrated in FIG. 11, if a tracked pet is a cat and the cat is indoors daily during the hours of 7 PM until 7 AM, then subscriber service usage profile 907 is modified to plan 1 of location coordinate service library associated with indoor cats). Internal clock 920 utilizes plan 1 to provide instructions to shut down and/or automatically restart GPS acquisition device 906 and GPRS and/or GSM transceiver device 908 of portable tracking device 902 to conserve power of battery 118 and maintain a plan prescribed level of service.

In yet another embodiment, if tracked person is an Alzheimer's patient and the patient is in physical therapy is weekly during the hours of 10:00 AM through 12:00 PM weekly on alternative Tuesday and Thursdays, daily sleeping during the hours of 7 PM to 7 AM, and under family supervision on Saturdays, then subscriber service usage profile 907 is modified. In this exemplary embodiment, plan 2 of location coordinate service library is implemented that is associated with Alzheimer's and Senior Patients having morning physical therapy on Tuesdays and Thursdays and off on weekends. Internal clock 920 utilizes plan 2 to schedule shut down and substantially automatic restart of GPS acquisition device 906 and GPRS and/or GSM transceiver device 908 of portable tracking device 902 in accordance with plan to conserve power of battery 118 but also to maintain a plan prescribed level of service.

In yet another embodiment, if tracked object is a rental automobile, then when the rental automobile is located on the lot in a secure location or in a repair garage during scheduled periods, then subscriber service usage profile 907 is modified to utilize plan 3 of location coordinate service library associated with garaged rental cars. In accordance with plan 3, internal clock 920 provides instructions to shut down GPS acquisition device 906 and GPRS and/or GSM transceiver device 908 of portable tracking device 902 and restart substantially automatically to conserve power of battery 118 but also maintain a plan prescribed level of service.

Referring to Table 1, different service plans of location service coordinate library are illustrated for a tracked pet that is a dog. In this exemplary embodiment, subscriber service usage profile 907 utilizes one or more battery power optimized usage plans. The below battery power optimized usage plans including profile names, for example, Dog-In-Yard, Dog-On-Leash, and Dog-Loose, stored or loaded in flash memory device 912 of portable tracking device 901 optimized for a selected coverage zone (Expected Zone).

TABLE 1

Service Plans of Location Service Coordinate Library

| Profile Name | Locate Interval | Max Speed | Transmit Interval | Expected Zone | Next Profile |
|---|---|---|---|---|---|
| Dog-In-Yard | 20 Minutes | 4 MPH | 4 hours | Home Yard | Dog-On-Leash |
| Dog-On-Leash | 10 Minutes | 4 MPH | 60 Minutes | Neighborhood | Dog-Loose |
| Dog-Loose | 2 Minutes | 7 MPH | 2 Minutes | | |

Continuing with this example, in the Expected Zone Home Yard, subscriber 904 is provided fix location of portable tracking device 901 every 20 minutes and a transmit interval of position fix to server 902 every four (4) hours. In one variant, internal clock 920 shuts down GPS acquisition device 906 and GPRS and/or GSM transceiver device 908 (e.g., in accordance with a plan that is part of location coordinate service library) of portable tracking device 901 in between performance of fix location and transmit intervals to conserve power of battery 118. Using this option, a dog's owner (subscriber 904) monitors and detects when dog having portable tracking device 901 leaves the yard in 20 minute intervals in response to internal clock 920 activating or deactivating GPS acquisition device 906 and GSM and/or GSM transceiver device 908.

However, if subscriber 904 (owner) takes dog for a walk, portable tracking device 901 detects egress from Expected Zone Home Yard. On a next or subsequent cycle (as addressed by location service coordinate library) of internal clock 920, portable tracking device 901 substantially automatically configures itself for profile Dog-On-Leash with expected Neighborhood zone, where dog has a maximum speed of 4 MPH. Advantageously, subscriber service usage profile 907 is updated without the need to contact server 902; thus, substantial battery life is maintained. Furthermore, if dog leaves Expected Zone Neighborhood or exceeds 4 MPH, then on next cycle or subsequent cycle (as addressed by location service coordinate library) of internal clock 920, portable tracking device 901 substantially automatically reconfigures itself for the "Dog-Loose" profile, which profile detects a location of and reports location to server 902 every two (2) minutes.

In one embodiment, to accomplish automatic or substantially automatic reconfiguration capabilities, portable tracking device 902 includes exemplary programming elements such as: Command Memory, Command Scripts, Schedules, Zones, and Thresholds.

Command Memory

Portable tracking device 901 stores frequently utilized commands e.g., 255, in Command Memory. In one embodiment, Command Memory includes flash memory device 912, where a single byte memory location references frequency utilized commands. Server 902 communicates a "Run Command From Memory" statement to flash memory device 912 and references the single-byte memory location stored in flash memory device 912. Flash memory device 912 executes command as if statement was freshly received from Server 902. Frequently used commands, for instance, as determined by server 902, will be stored in the Command Memory and utilized, for example, by Command Scripts.

Command Scripts

Command scripts are lists of commands that are run in a script. The Command script ID identifies a particular script, which is a 32-element list of commands from command memory. For example, if command script 05 contained the following data (only the first 16 elements are shown):

| 05 | 01 | 02 | 05 | 06 | 1B | 09 | 0A | 00 | 00 | 00 | 00 | 00 | 00 | 00 | 00 |
|----|----|----|----|----|----|----|----|----|----|----|----|----|----|----|----|

In this exemplary embodiment, the script runs seven commands from Command Memory (01, 02, 05, 06, 1B, 09, and 0A). Note that these are not commands from server 902; they are commands stored in memory (e.g., flash memory device 912) via previous message from server 902. In one embodiment, the special case of "00" causes no command to be run. Advantageously, command script resident on flash memory device 912 perform any or all of the following (singley or collectively) of the following: Enable/disable zones, Enable/disable thresholds, Enable/disable schedules, Send a message to Server, and perform other like commands.

In one exemplary embodiment, enable/disable thresholds include enabling or disabling one or more settings, e.g., timer settings. For instance, when a tracked object enters a restricted zone 914, a counting sequence is initiated. If tracked object is within restricted zone 914 for more than a designated period, internal clock 920 (on next cycle or subsequent cycle as determined by subscriber service usage profile 907) issues a command to automatically update profile, e.g., increase taking position fix and sending report to server 902.

Schedule

Within portable tracking device 901, scheduling system provides Command Scripts to be scheduled for later or repeated at specific intervals. Scheduling allows command and control system of server 902 to load portable tracking device 901 with zones of coverage (Enable/disable zones, allowed zones, restricted zones . . . ) and thresholds (Enable/disable thresholds). Advantageously, even if zone changes as a result of changing detected location of portable tracking device 902 during the day, no messaging is required to server 902. Advantageously in contrast to conventional GPS systems, scheduled commands are interpreted by portable tracking device 901 as if they were received by server 902 (including the header).

As illustrated in Table 2, scheduled commands may be formatted to ignore the Message ID and CRC checking. In yet another variant, scheduling system does not include commands that affect any CRCs.

TABLE 2

Schedule Command Format

| Element | Data Type | Description |
|---------|-----------|-------------|
| Schedule ID | 1 byte | The ID of the schedule element |
| Status | 1 byte | 0 = this zone is not active;<br>1 = this zone is active<br>(this value is not used for CRC calculations) |
| Schedule Mask | 1 Byte | Bitmap to indicate when this command should be processed:<br>1 = Saturday<br>2 = Friday<br>4 = Thursday<br>8 = Wednesday<br>16 = Tuesday<br>32 = Monday<br>64 = Sunday<br>128 = Automatically delete this schedule at the end of the week (this schedule runs only once)<br>If all bits are set to 0, this schedule is considered disabled. |
| Time On | Integer | The second-of-the-day when this schedule should activate during the day |
| Time Off | Integer | The second-of-the-day when this schedule should deactivate during the day |

TABLE 2-continued

Schedule Command Format

| Element | Data Type | Description |
|---------|-----------|-------------|
| Repeat Duration | Integer | The interval in seconds for this command to be repeated throughout the time-on and time-off window. |

TABLE 2-continued

Schedule Command Format

| Element | Data Type | Description |
| --- | --- | --- |
| Command Script | 1 byte | The script ID to run at the scheduled time |

Zones

In one embodiment, zones of coverage (e.g., restricted, allowed) are defined by circles having a center point and a radius. Circular zones have seven elements including those illustrated in Table 3:

TABLE 3

Zone Elements

| Element | Data Type | Description |
| --- | --- | --- |
| Zone ID | 1 byte | The ID of the zone |
| Status | 1 byte | 0 = this zone is not active; 1 = this zone is active (this value is not used for CRC calculations) |
| Latitude | Double | The Latitude of the center point |
| Longitude | Double | The Longitude of the center point |
| Radius | Double | The radius of the circle |
| Ingress Script | 1 byte | The script ID to run if the zone is entered |
| Egress Script | 1 byte | The script ID to run if the zone is exited |

In one embodiment, when determining position fix, portable tracking device 901 iterates through active zones (restricted, allowed . . . that are part of zone management map) in memory, e.g., flash memory 912, to determine if boundaries have been crossed to any zones. Upon detecting crossing of one or more zones, portable tracking device 901 checks Ingress and Egress script(s) for corresponding coverage zone (restricted and allowed) and runs the specified command script. Upon detection of Ingress or Egress, portable tracking device 901 sends an alert to server 902.

In one exemplary embodiment, portable tracking device 901 determines positioning and whether located inside a zone. During processing, one or more calculations are performed including portable tracking device 901 determining distance from center point of one or more zones of coverage. If delta distance, e.g. distance between restricted and allowed zone, is less than or equal to the radius, portable tracking device 901 considers itself inside a selected zone. However, if delta distance is greater than the radius, portable tracking device 901 is considered outside a selected zone.

Continuing with this exemplary embodiment, delta distance is calculated using a spherical model of the Earth with the WGS-84 arithmetic mean radius, which is 6,371,008.7714 meters. In one embodiment, the calculation includes law of cosines that calculates great-circle distance between two GPS coordinates in accordance with the following equation:
var radius=6,371,008.7714;
var distance=
  radius*
  acos(cos(point1.Latitude*π/180)*
  cos(point2.Latitude*π/180)*
  cos((point1.Longitude−point2.Longitude)*π/180)+
  sin(point1.Latitude*π/180)*
  sin(point2.Latitude*π/180))
Thresholds Portable tracking device 901 monitors operating variables to make sure within threshold values. In one embodiment, if any operating values fall outside a designated acceptable range, portable tracking device 901 runs a command script.

One or more thresholds may be placed upon any operating variable. Comparisons can be numeric or based upon ASCII values (alphabetic in ASCII order). In one variant, more than one threshold can be set upon the same variable. Thresholds are usually activated or deactivated during a scheduled command. For instance, thresholds may take on a Boolean statement in the form ([operating variable] [comparison] [value])

An exemplary script runs when an operating variable called battery_level (expressed as a value between 0 and 255) falls below 51 (about 20%) is (battery_level<51)

If battery_level is below 51, the above expression is TRUE.

In one example, thresholds are an expression that evaluates as to a value of either TRUE or FALSE. Whenever one or more operating variable(s) are updated in memory, e.g., flash memory 912, portable tracking device 901 calculates any value of one or more thresholds associated with that variable. If the result of the calculation was previously TRUE and is now FALSE, the "false script" is run. If the result of the calculation was previously FALSE and is now TRUE, the "true script" is run.

In one embodiment, threshold include the elements described below:

| Element | Data Size | Description |
| --- | --- | --- |
| Threshold ID | 1 byte | The ID of the Threshold |
| Operating Variable ID | 1 byte | The ID of the Operating Variable being monitored |
| False Script | 1 byte | The script ID to run if this evaluation changes to FALSE |
| True Script | 1 byte | The script ID to run if this evaluation changes to TRUE |
| Status | 1 bit | 0 = Off. This Threshold is off<br>1 = On. This Threshold is on |
| Inequality | 7 bits | The type of inequality for the comparison.<br>1 = the variable must be equal to this value (i.e. '==')<br>2 = the variable must be less than this value (i.e. '<')<br>3 = the variable must be greater than this value (i.e. '>')<br>4 = the variable must be less than or equal to this value (i.e. '<=')<br>5 = the variable must be greater than or equal to this value (i.e. '>=')<br>6 = the variable must be not equal to this value (i.e. '<>' or '!=') |
| Value | 16 bytes | The value for the comparison. |

Advantageously, as compared with conventional mobile tracking devices that activate and deactivate in response to signaling from location tracking server 912, which depletes battery life, the present embodiment(s) have internal clock 920 that activates and deactivates substantially independently of any signaling, for instance, by or from GSM and/or GPRS transceiver device 908 and GPS mobile location tracking module 906.

In one embodiment, "on-demand" internal clock 920 activates or deactivates GPRS and/or GSM transceiver device 908 and computation processor 918 in accordance with position fix relative to, for instance, subscriber service usage profile 907 in accordance with current position fix of mobile location tracking device 901 relative to the selected location coordinate zones (e.g., restricted areas or zones 914 or allowed areas or zones 916) on zone management map 917. In one variant, subscriber service usage profile 907 comprises a prior or scheduled daily or monthly profile of subscriber 904 designated reporting interval for mobile location tracking device 901.

In yet another embodiment, scriber service usage application (stored in Flash Memory 912) may be controlled by an external clock 931 (having similar functionality as internal clock 920) to computational processor 918 to regulate and control (either in a primary or secondary capacity to supplement or replace internal clock 920) activation and deactivation of modules (e.g., GSM and/or GPRS transceiver modules and/or GPS acquisition module) on the mobile location tracking device 901.

In another variant, GPRS transmission device 908 includes a deactivated mode where GPRS transmission device 908 switches-off (switched-off mode) and is not in service contact with subscriber 904. In one variant, Short Message Service (SMS) messages sent during switched-off mode are received by the GPRS transmission device during an upcoming switched-on mode. In another embodiment, GSM transmission device 908 reports position fix to the subscriber and deactivates the GSM transmission device 908, e.g., places GSM transmission device 908 in a deactivated mode, in accordance with the subscriber service usage pattern. In another variant, GPRS transmission device 908 includes a deactivated mode where GPRS transmission device 908 is in switched-off mode and not in service contact with subscriber and location tracking server 902.

In one alternative of this variant, GPRS transmission device 908 receives SMS messages sent during switched-off mode during an upcoming switched-on mode. In one embodiment, GPS acquisition device 908 comprises a deactivated mode and internal clock 920 activates and deactivates GPS acquisition device 906 independently of signaling from location tracking server 902 in accordance with subscriber service usage profile 907. In one embodiment, subscriber 904 configures mobile location tracking device 900 by sending an SMS message or sending text through an Internet web interface inputs.

In yet another exemplary embodiment, upon activation by internal clock 920, GPS acquisition device 906 receives current position fix, frequency to report the current position fix to subscriber is updated in accordance with current position fix, and GPS acquisition device 908 returns to a deactivated mode. In another embodiment, an accelerometer and motion readings by accelerometer (e.g., accelerometer 130 shown and described in prior embodiment) are analyzed in accordance with subscriber service usage profile 907 to determine if current position fix has entered one or more selected locations of zone management map 917 or violated one or more thresholds.

In summary, a power management device disclosed above determines update rate and reporting of a position fix of a mobile location tracking device to a location tracking server. In one embodiment, an accelerometer is provided to allow motions of mobile location tracking device 901 to determine position fix update rate and reporting thereof to location tracking server 902. Included as part of power management device, a computational processor 918 having internal clock 920. In accordance with a subscriber service usage profile 907, internal clock 920 activates and deactivates location tracking coordinate transmission and acquisition GSM and/or GPRS transceiver module 908 and GPS module 906 of mobile location tracking device 901 substantially independently of communicated signals by location tracking server 902.

In one variant, internal clock 920 incorporates mobile location tracking device 901 motion inputs from accelerometer 130 to determine whether to activate and deactivate transmission and acquisition GSM and/or GPRS transceiver modules of location tracking device 901. In one alternative of this variant, upon activation by internal clock 920, accelerometer 113 generates motion inputs that are inputted to update subscriber service usage profile 907 stored (e.g., resident) on flash memory 912 to update a previous position fix to a current position fix for mobile location tracking device 901. In yet another alternative variant, current position fix updates reporting frequency of position fix of mobile location tracking device 901 to location tracking server 902.

In another alternative embodiment, upon activation by internal clock 920, GPS acquisition module 906 receives current position fix, updates reporting frequency of the position fix of the mobile location tracking device 901 is updated in accordance with the current position fix at least partially in accordance with subscriber service usage profile 907 stored in flash memory device 912, and the GPS acquisition device 906 returns to the deactivated mode.

In yet another embodiment, subscriber service usage profile 907 updates in accordance with an SMS message communicated between a mobile cellular device 937 or location tracking server 902 and mobile location tracking device 901. The subscriber service usage profile 907 comprises a zone management map 915 of selected location coordinates and updates in accordance with, for instance, an SMS message communicated between mobile cellular device 927 or location tracking server 902 and mobile location tracking device 901. In addition, subscriber service usage profile 907 includes previous and current subscriber usage patterns that are utilized for location tracking coordinate management and updating thereof.

Figure 8:
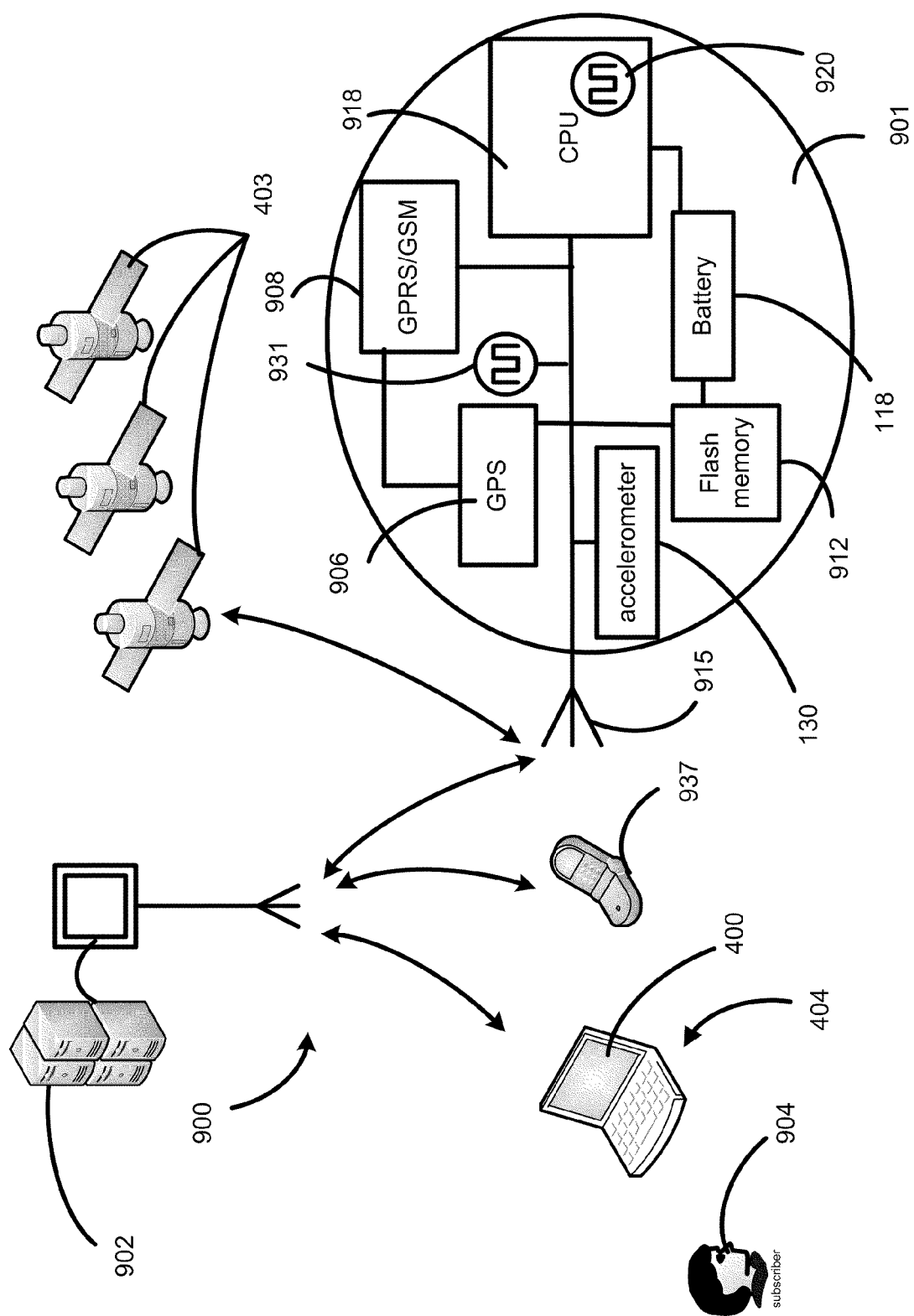
FIG. 8 illustrates a location coordinate system utilizing a mobile location tracking device that has a position fix update system that deactivates GPS acquisition module, GSM and/or GPRS transceiver modules, utilizing a subscriber service usage application activated by an internal clock in accordance with subscriber service usage profile in accordance with an embodiment of the present invention.
Figure 9:
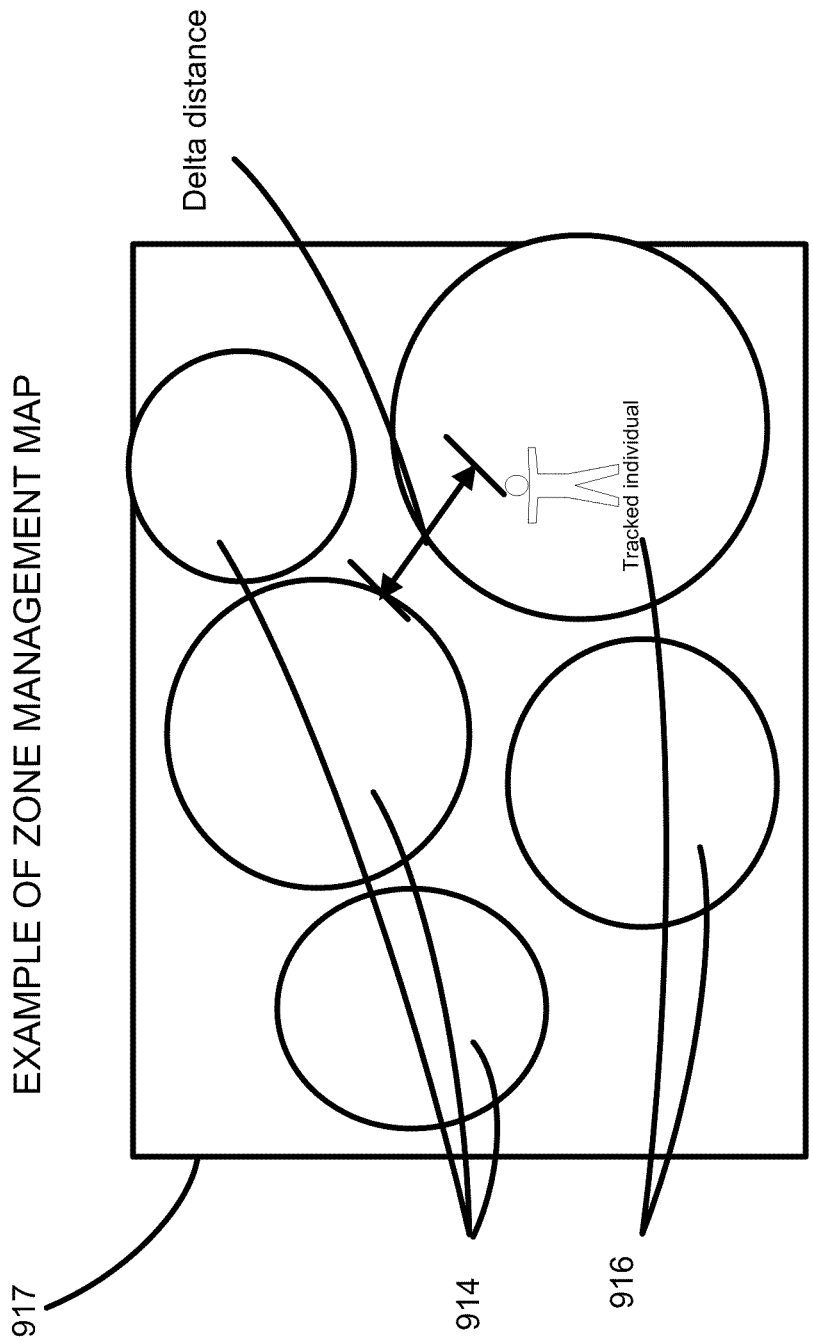
FIG. 9 illustrates a graphical mapping representation of restricted and allowed zones of a map management module loaded in a memory device of the mobile location tracking device of FIG. 8 in accordance with an embodiment of the present invention.
Figure 12:
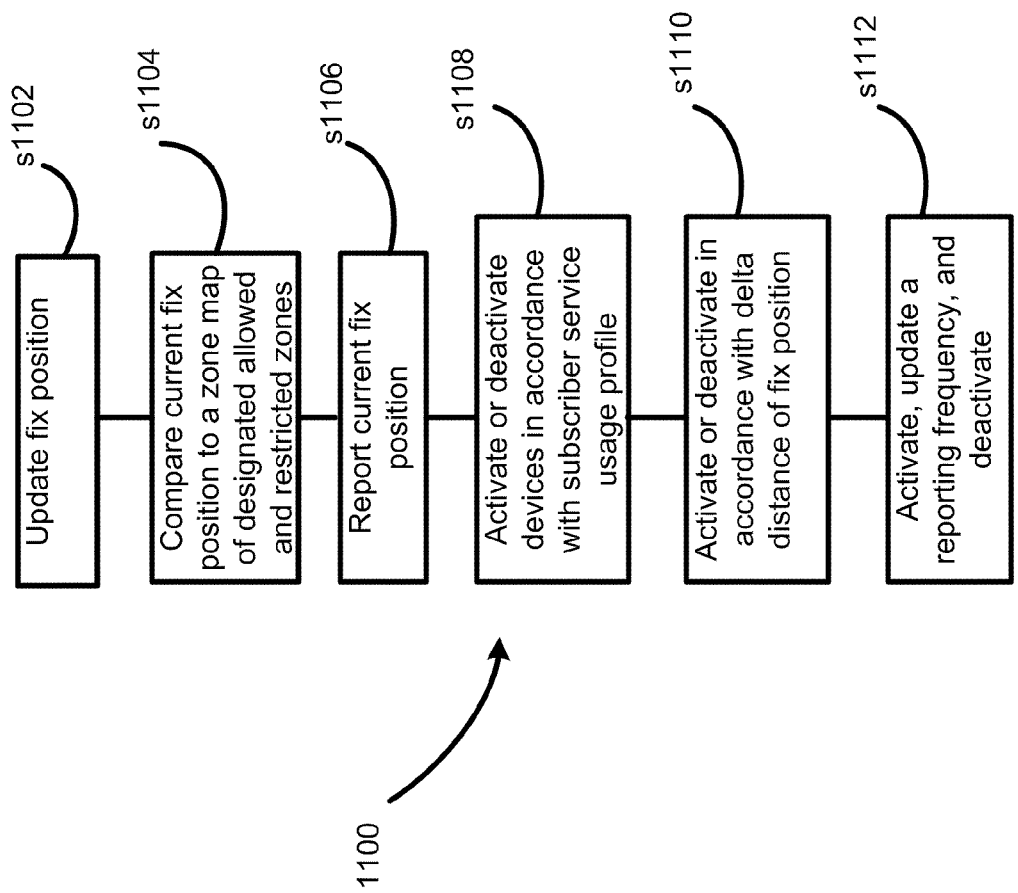
FIG. 12 illustrates a flow diagram of a mobile tracking device of FIGS. 8-11 that has its position fix updated in accordance with subscriber service usage application in accordance with an embodiment of the present invention.

Referring to FIG. 12, flow chart 1100 illustrates power conservation process when updating position fix of a portable location tracking device 901 being tracked and reported to a location tracking server 908, as described in more detail in FIGS. 8, 9, and 10, in accordance with one embodiment of the present invention. In step 1102, a power conservation process updates position fix of a mobile location tracking device 901 in accordance with generation of a current position fix by GPS acquisition device 906. In step 1104, current position fix is compared relative to a zone management map 917 of designated allowed 916 and restricted 914 location coordinate zones stored in a flash memory device 912 as part of subscriber usage service profile 907 associated with the mobile location tracking device 900. In step 1106, current position fix is reported by GPRS and/or GSM transceiver device to location tracking server 902.

In step 1108, GPS acquisition device, GPRS and/or GSM transceiver device 908, and computational processor (CPU) 918 are activated or deactivated in accordance with subscriber service usage profile 907 and current position fix relative to zone management map 917 of designated allowed 916 and restricted 914 location coordinate zones. In step 1110, internal clock 920 activates or deactivates substantially independent of communicated signals from location tracking server 902 to GPS acquisition device 906, the GPRS and GSM transceiver device in accordance with the subscriber usage service profile 907 in response to a delta distance (e.g., differential distance) between a position fix of the mobile location tracking device relative to one or more designated allowed location coordinate zones 916 and restricted location coordinate zones 914 or violated a threshold conditions, such as entering a boundary or contour or zone violation for a specified period or time.

In one variant of step 1100, deactivating the GPRS and/or GSM transceiver device comprises switching-off the GPRS and/or GSM transceiver device and not providing service contact with subscriber 904 and to receive SMS messages sent to mobile tracking device 901 during the switched-off mode during an upcoming switched-on mode. In another variant of step 1100, analysis of motion readings from accelerometer 130 by computational processor 918 determines if the current position fix has entered one or more designed allowed location coordinate zones 916 or restricted location coordinate zones 914 and causing a zone violation of one or more of these zones.

In step 1112, mobile location tracking device 901 actives GPS acquisition device 906 by internal clock 920, acquires current position fix by GPS acquisition device 906; and updates reporting frequency of current position fix to subscriber 904 in accordance with current position fix, and returns GPS acquisition device 906 to deactivated mode until activated by internal clock 920.

In one variant of step 1112, a timer is started when mobile location tracking device 901 has passed a threshold into a restricted location coordinate zone; readings of the timer are analyzed to determine how long the mobile location tracking device has entered the restricted location coordinate zone; subscriber usage service application 907 is updated with a profile associated with Expected Zone responsive to entry into the restricted location coordinate zone that is part of location coordinate service library and previously communicated by the location tracking server 902 during an SMS transmission; the GPS acquisition device 908 acquires an updated current position fix in response to selection of the profile associated with the Expected Zone to account for GPS satellite displacement (drift) during measurement; reporting frequency communicated including the updated current position fix in response to selection of the profile associated with the Expected Zone to account for the GPS satellite displacement during measurement; and the GPS acquisition device returned to deactivated mode in accordance with the profile associated with the Expected Zone until activated by internal clock 920.

It is noted that many variations of the methods described above may be utilized consistently with the present invention. Specifically, certain steps are optional and may be performed or deleted as desired. Similarly, other steps (such as additional data sampling, processing, filtration, calibration, or mathematical analysis for example) may be added to the foregoing embodiments. Additionally, the order of performance of certain steps may be permuted, or performed in parallel (or series) if desired. Hence, the foregoing embodiments are merely illustrative of the broader methods of the invention disclosed herein.

While the above detailed description has shown, described, and pointed out novel features of the invention as applied to various embodiments, it will be understood that various omissions, substitutions and changes in the form and details of the device or process illustrated may be made by those skilled in the art without departing from the spirit of the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A power conservation process to update a position fix of a mobile location tracking device being tracked by a location tracking server, the power conservation process comprising: generating a current position fix by a GPS (Global Positioning System) acquisition device; comparing the current position fix relative to a zone management map of designated allowed and restricted location coordinate zones stored in a memory device associated with the mobile location tracking device; reporting the current position fix by a GPRS (General Packet Radio Services) transceiver device or a GSM (Global System for Mobile communications) transceiver device to the location tracking server; deactivating the GPS acquisition device, the GPRS transceiver device or the GSM transceiver device, and a computational processor in accordance with a subscriber service usage application and the current position fix relative to the zone management map of the designated allowed and restricted location coordinate zones; activating by an internal clock substantially independent of communicated signals from the location tracking server the GPS acquisition device, the GPRS transceiver device or the GSM transceiver device in accordance with the subscriber usage service application in response to a delta distance between the current position fix of the mobile location tracking device relative to the zone management map of the designated allowed and restricted location coordinate zones; starting a timer when the mobile location tracking device has passed a threshold into a restricted location coordinate zone; analyzing readings of the timer to determine how long the mobile location tracking device has entered the restricted location coordinate zone; updating the subscriber usage service application with a profile associated with an expected zone that is part of a location coordinate service library and previously communicated by the location tracking server during an SMS (Short Message Service) transmission; acquiring by the GPS acquisition device an updated current position fix in response to selection of the profile associated with the expected zone to account for GPS satellite displacement during measurement; updating a reporting frequency of the updated current position fix in response to selection of the profile associated with the expected zone to account for the GPS satellite displacement during measurement; and returning the GPS acquisition device to a deactivated mode in accordance with the profile associated with the expected zone until activated by the internal clock.

2. The power conservation process of claim 1, wherein deactivating the GPRS transceiver device or the GSM transceiver device comprises switching-off the GPRS transceiver device or the GSM transceiver device and not providing service contact with a subscriber and receiving SMS messages sent during a switched-off mode during an upcoming switched-on mode.

3. The power conservation process of claim 1, further comprising activating by the internal clock the GPS acquisition device and updating the reporting frequency of the current position fix to the subscriber in accordance with the current position fix.

4. The power conservation process of claim 1, further comprising the step of analyzing motion readings from an accelerometer by the computational processor to determine if the current position fix has entered one or more selected or restricted location coordinate zones and caused a zone violation of one or more outer contour areas of the zone management map.

5. The power conservation process of claim 1, further comprising updating the subscriber usage service application with a second profile that substantially matches the restricted location coordinate zone in response to readings of the timer that indicate the mobile location tracking device has entered the restricted location coordinate zone for more than a specified period.

6. The power conservation process of claim 1, further comprising updating the subscriber usage service application with a second profile from a location coordinate service library previously communicated by the location tracking server, wherein the second profile substantially matches the restricted location coordinate zone and is responsive to the reading of the timer that indicates when the mobile location tracking device has entered the restricted location coordinate zone for more than a specified period.

\* \* \* \* \*